(12) United States Patent
Siy et al.

(10) Patent No.: US 11,830,119 B1
(45) Date of Patent: Nov. 28, 2023

(54) MODIFYING AN ENVIRONMENT BASED ON SOUND

(71) Applicant: Apple Inc., Cupertino, CA (US)

(72) Inventors: Ronald Vernon Ong Siy, San Francisco, CA (US); Scott Rick Jones, San Rafael, CA (US); John Brady Parell, San Mateo, CA (US); Christopher Harlan Paul, Redwood City, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/242,839

(22) Filed: Apr. 28, 2021

Related U.S. Application Data

(60) Provisional application No. 63/032,515, filed on May 29, 2020.

(51) Int. Cl.
| | |
|---|---|
| G06T 13/00 | (2011.01) |
| G06T 13/20 | (2011.01) |
| G06F 3/16 | (2006.01) |
| H04R 5/04 | (2006.01) |
| G06T 19/00 | (2011.01) |

(52) U.S. Cl.
CPC ............ *G06T 13/205* (2013.01); *G06F 3/16* (2013.01); *G06T 19/00* (2013.01); *H04R 5/04* (2013.01)

(58) Field of Classification Search
CPC ......... G06T 13/205; G06T 19/00; G06F 3/16; H04R 5/04
See application file for complete search history.

(56) References Cited

U.S. PATENT DOCUMENTS

| | | | | |
|---|---|---|---|---|
| 6,369,822 B1 * | 4/2002 | Peevers | .............. | G06T 13/205 |
| | | | | 704/E21.02 |
| 8,085,269 B1 * | 12/2011 | Classen | ................. | G11B 27/34 |
| | | | | 381/119 |
| 9,891,884 B1 * | 2/2018 | Baughman | .............. | G06F 3/165 |
| 10,225,656 B1 * | 3/2019 | Kratz | .................... | G06T 19/003 |
| 10,445,936 B1 * | 10/2019 | Charlton | ................ | G06F 3/165 |
| 10,514,887 B2 | 12/2019 | Thagadur Shivappa et al. | | |
| 2012/0075285 A1 * | 3/2012 | Oyagi | .................... | A63F 13/65 |
| | | | | 345/419 |
| 2012/0206452 A1 * | 8/2012 | Geisner | ................. | G06V 10/26 |
| | | | | 345/419 |
| 2012/0249741 A1 * | 10/2012 | Maciocci | ............. | G06T 19/006 |
| | | | | 348/51 |

(Continued)

FOREIGN PATENT DOCUMENTS

WO       WO-0126073 A2 *    4/2001            A63F 13/10

*Primary Examiner* — Weiming He
(74) *Attorney, Agent, or Firm* — Fernando & Partners, LLP

(57) ABSTRACT

Various implementations disclosed herein include devices, systems, and methods for modifying an environment based on sound. In some implementations, a device includes one or more processors, a display and a non-transitory memory. In some implementations, a method includes displaying a computer graphics environment that includes an object. In some implementations, the method includes detecting, via an audio sensor, a sound from a physical environment of the device. In some implementations, the sound is associated with one or more audio characteristics. In some implementations, the method includes modifying a visual property of the object based on the one or more audio characteristics of the sound.

22 Claims, 15 Drawing Sheets

(56) References Cited

U.S. PATENT DOCUMENTS

| | | | | |
|---|---|---|---|---|
| 2016/0163168 A1* | 6/2016 | Brav | .................... | G08B 29/188 |
| | | | | 381/56 |
| 2017/0345216 A1* | 11/2017 | Boyle | .................... | H04N 5/272 |
| 2018/0246698 A1* | 8/2018 | Huang | .................. | G06T 19/006 |
| 2018/0324025 A1 | 11/2018 | Van Wie et al. | | |
| 2019/0094981 A1* | 3/2019 | Bradski | .................. | G06F 3/017 |
| 2019/0121522 A1* | 4/2019 | Davis | .................. | H04N 9/3185 |
| 2019/0344185 A1* | 11/2019 | Fargo | .................... | G06T 19/20 |
| 2019/0377538 A1* | 12/2019 | Jones | ...................... | G06T 11/00 |
| 2019/0387299 A1 | 12/2019 | Evans et al. | | |
| 2020/0035003 A1* | 1/2020 | Canberk | ............... | G06T 19/006 |
| 2020/0074705 A1* | 3/2020 | Berger | .................... | G06T 13/80 |
| 2021/0042507 A1* | 2/2021 | Raviv | .................. | G06V 40/165 |
| 2021/0048975 A1* | 2/2021 | Panwar | .................... | G06F 3/165 |
| 2021/0166481 A1* | 6/2021 | Lam | ....................... | G06V 10/60 |
| 2021/0192802 A1* | 6/2021 | Nepveu | ................. | A63F 13/213 |
| 2022/0011860 A1* | 1/2022 | Cappello | ................ | G06T 13/40 |
| 2022/0092862 A1* | 3/2022 | Faulkner | ................... | G06T 7/20 |

\* cited by examiner

MODIFYING AN ENVIRONMENT BASED ON SOUND

CROSS-REFERENCE TO RELATED APPLICATION

This application claims the benefit of U.S. Provisional Patent App. No. 63/032,515, filed on May 29, 2020, which is incorporated by reference in its entirety.

TECHNICAL FIELD

The present disclosure generally relates to techniques for modifying a computing environment based on sound.

BACKGROUND

Some devices are capable of generating and presenting graphical environments that include many objects. These objects may mimic real world objects. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
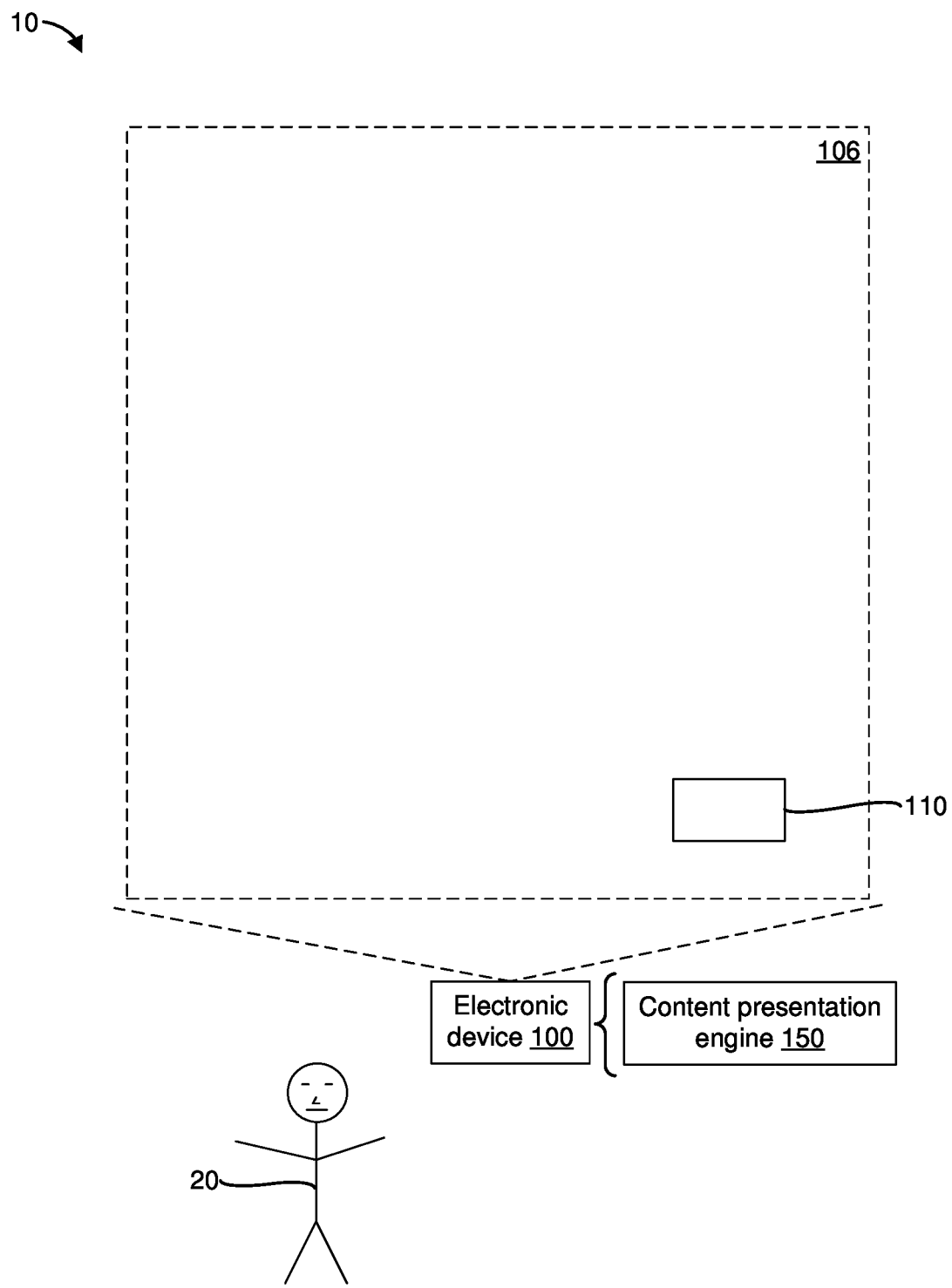
FIGS. 1A-1L are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for modifying a computer graphics environment based on sound. In some implementations, a device includes one or more processors, a display and a non-transitory memory. In some implementations, a method includes displaying a computer graphics environment that includes an object. In some implementations, the method includes detecting, via an audio sensor, a sound from a physical environment of the device. In some implementations, the sound is associated with one or more audio characteristics. In some implementations, the method includes modifying a visual property of the object based on the one or more audio characteristics of the sound.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, a user can obtain objects from an object datastore and place the objects in an XR environment. For example, a user may obtain a motorcycle object and place the motorcycle object in the XR environment. However, configuring the objects may require the user to provide additional user inputs. For example, defining how the motorcycle object appears when the motorcycle object simulates a motorcycle that is being revved-up may require the user to provide a sequence of user inputs. Similarly, defining how the motorcycle object moves within the XR environment when the user abruptly releases a brake control of the motorcycle object while holding an accelerator control of the motorcycle object may require another sequence of user inputs. Requiring unnecessary user inputs detracts from the user experience. Requiring unnecessary user inputs may also reduce a battery life of a battery-operated device.

The present disclosure provides methods, systems, and/or devices for modifying a visual property of an object in an XR environment based on a sound from a physical environment. A device detects audio from a physical environment and modifies a visual property of an object in an XR environment based on the audio from the physical environment. For example, if the user is playing with a motorcycle object in an XR environment and the user utters "vroom vroom", then the device modifies the motorcycle object to show graphical smoke coming out of an exhaust of the motorcycle object. As another example, the device may display a movement of the motorcycle object within the XR environment in response to the user uttering "Go! Go! Go!".

Modifying the XR environment based on a sound from a physical environment tends to make the XR environment appear more realistic. For example, modifying a visual property of an object in the XR environment based on a sound from the physical environment provides an appearance that the object responds to real-world stimuli. Modifying the XR environment based on a sound from the physical environment reduces the need for user inputs that correspond to the user explicitly defining behavior of certain objects. Reducing the need for unnecessary user inputs tends to enhance the user experience and increase a battery life of a battery-operated device.

FIG. 1A is a block diagram of an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes an electronic device 100 and a content presentation engine 150. In some implementations, the electronic device 100 includes a handheld computing device that can be held by a user 20. For example, in some implementations, the electronic device 100 includes a smartphone, a tablet, a media player, a laptop, or the like. In some implementations, the electronic device 100 includes a wearable computing device that can be worn by the user 20. For example, in some implementations, the electronic device 100 includes a head-mountable device (HMD) or an electronic watch.

Although the content presentation engine 150 is shown as being integrated into the electronic device 100. In some implementations, the content presentation engine 150 is separate from the electronic device 100. For example, in some implementations, the content presentation engine 150 resides at another device (e.g., at a controller, a server or a cloud computing platform).

As illustrated in FIG. 1A, in some implementations, the electronic device 100 presents an XR environment 106. In some implementations, the XR environment 106 is referred to as a computer graphics environment. In some implementations, the XR environment 106 is referred to as a graphical environment. In some implementations, the electronic device 100 generates the XR environment 106. Alternatively, in some implementations, the electronic device 100 receives the XR environment 106 from another device that generated the XR environment 106.

In some implementations, the XR environment 106 includes a virtual environment that is a simulated replacement of a physical environment. In some implementations, the XR environment 106 is synthesized by the electronic device 100. In such implementations, the XR environment 106 is different from a physical environment in which the electronic device 100 is located. In some implementations, the XR environment 106 includes an augmented environment that is a modified version of a physical environment. For example, in some implementations, the electronic device 100 modifies (e.g., augments) the physical environment in which the electronic device 100 is located to generate the XR environment 106. In some implementations, the electronic device 100 generates the XR environment 106 by simulating a replica of the physical environment in which the electronic device 100 is located. In some implementations, the electronic device 100 generates the XR environment 106 by removing and/or adding items from the simulated replica of the physical environment in which the electronic device 100 is located.

In some implementations, the XR environment 106 includes various virtual objects such as a motorcycle object 110. In some implementations, the virtual objects are referred to as graphical objects or XR objects. In various implementations, the electronic device 100 obtains the virtual objects from an object datastore (not shown). For example, in some implementations, the electronic device 100 retrieves the motorcycle object 110 from the object datastore. In some implementations, the virtual objects represent physical elements. For example, in some implementations, the virtual objects represent equipment (e.g., machinery such as planes, cars, ships, etc.). In some implementations, the virtual objects represent fictional elements (e.g., entities from fictional materials, for example, an action figure or a fictional equipment such as a flying motorcycle).

In various implementations, the content presentation engine 150 controls a presentation of the virtual objects in the XR environment 106. For example, in some implementations, the content presentation engine 150 controls a presentation of the motorcycle object 110. In various implementations, the content presentation engine 150 modifies a visual property of the virtual objects in the XR environment 106 based on stimuli (e.g., audio stimuli) from the physical environment of the electronic device 100. For example, in some implementations, the content presentation engine 150 modifies a visual property of the motorcycle object 110 based on audio detected in the physical environment of the electronic device 100. In various implementations, the content presentation engine 150 moves virtual objects within the XR environment 106 based on stimuli from the physical environment of the electronic device 100. For example, in some implementations, the content presentation engine 150 moves the motorcycle object 110 within the XR environment 106 based on audio detected in the physical environment of the electronic device 100.

In various implementations, the content presentation engine 150 performs operations that make the virtual objects in the XR environment 106 appear more realistic. For example, in some implementations, the content presentation engine 150 performs operations that make the motorcycle object 110 appear similar to a physical motorcycle. In various implementations, the content presentation engine 150 performs operations that make the virtual objects in the XR environment 106 respond to stimuli from the physical environment in a manner similar to how corresponding physical elements response to stimuli from the physical environment. In various implementations, the content presentation engine 150 performs operations that provide an appearance that the virtual objects in the XR environment 106 are generating the sound in the physical environment. For example, if an audio sensor such as a microphone of electronic device 100 detects that user 20 is uttering "vroom vroom", then the content presentation engine 150 modifies a visual property of the motorcycle object 110 in order to provide an appearance that the motorcycle object 110 is making the "vroom vroom" sound. In this example, the content presentation engine 150 may modify the visual property of the motorcycle object 110 in order to provide an appearance that motorcycle object 110 is being revved-up in a manner similar to how a corresponding physical motorcycle appears when the corresponding physical motorcycle is being revved-up. For example, the content presentation engine 150 may display a vibration of the motorcycle object 110 similar to a vibration of a physical motorcycle that is being revved-up.

In some implementations, the electronic device 100 includes or is attached to a head-mountable device (HMD) worn by the user 20. The HMD presents (e.g., displays) the XR environment 106 according to various implementations. In some implementations, the HMD includes an integrated display (e.g., a built-in display) that displays the XR environment 106. In some implementations, the HMD includes a head-mountable enclosure. In various implementations, the head-mountable enclosure includes an attachment region to which another device with a display can be attached. For example, in some implementations, the electronic device 100 can be attached to the head-mountable enclosure. In various implementations, the head-mountable enclosure is shaped to form a receptacle for receiving another device that includes a display (e.g., the electronic device 100). For example, in some implementations, the electronic device 100 slides/snaps into or otherwise attaches to the head-mountable enclosure. In some implementations, the display of the device attached to the head-mountable enclosure presents (e.g., displays) the XR environment 106. In various implementations, examples of the electronic device 100 include smartphones, tablets, media players, laptops, etc.

Figure 1B:
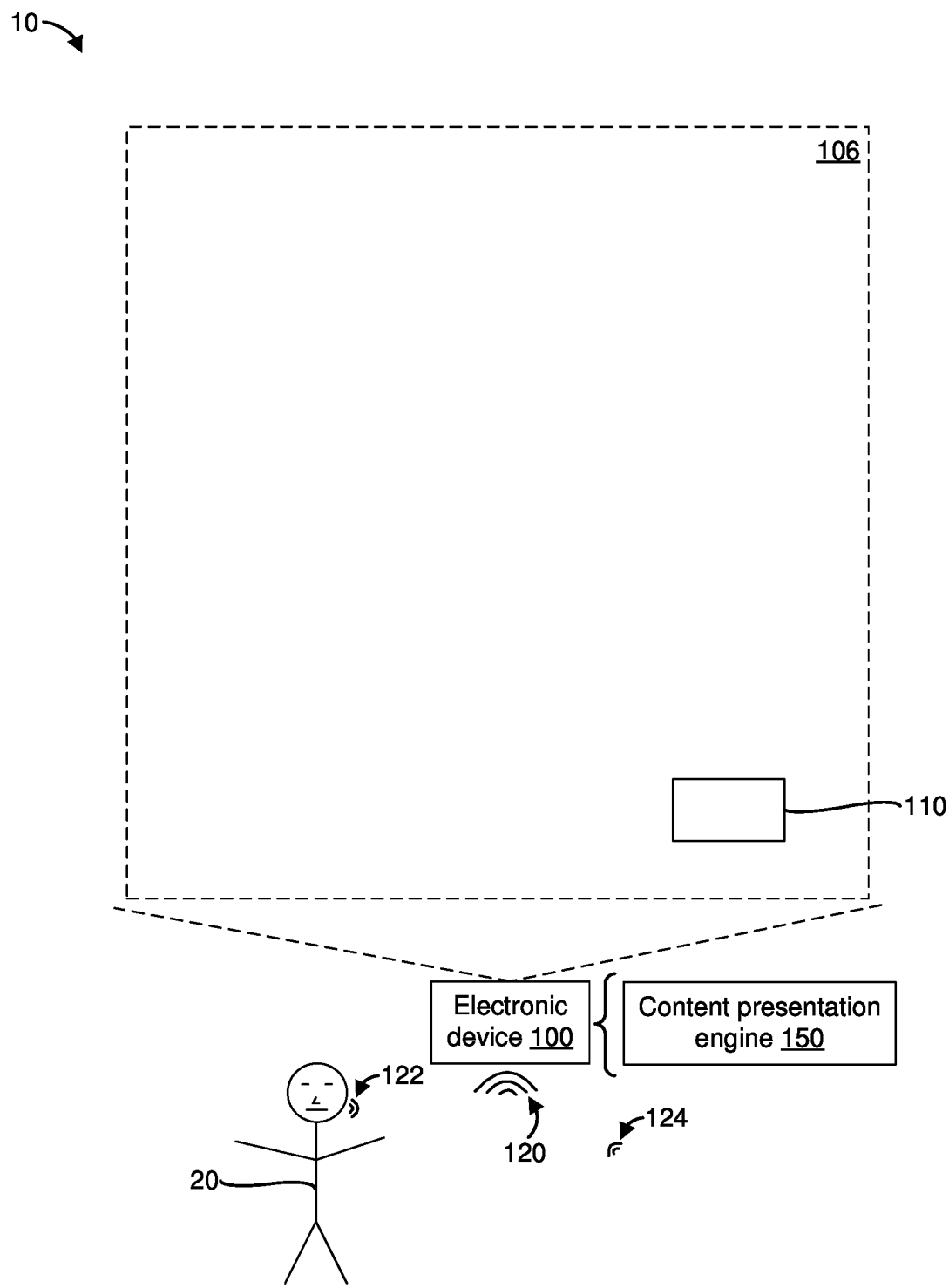

Referring to FIG. 1B, in some implementations, the electronic device 100 detects a sound 120 from the physical environment of the electronic device 100. In some implementations, the sound 120 includes an utterance 122 from the user 20. In some implementations, the utterance 122 is specifically directed at the electronic device 100. Alternatively, in some implementations, the utterance 122 is not directed at the electronic device 100. For example, in some implementations, the utterance 122 is part of a conversation that the user 20 is having with another person (not shown).

In some implementations, the sound 120 includes an environmental sound 124. In some implementations, the environmental sound 124 includes an ambient sound of the physical environment. In some implementations, the environmental sound 124 is generated by a physical element that corresponds to a virtual object that is displayed in the XR environment 106. For example, in some implementations, the environmental sound 124 includes a sound of a physical motorcycle engine being revved-up.

In some implementations, the electronic device 100 detects the sound 120 via an audio sensor (e.g., a microphone). In some implementations, the audio sensor is integrated into the electronic device 100. In some implementations, the audio sensor is separate from the electronic device 100. For example, the audio sensor is part of another device. In some implementations, the electronic device 100 includes multiple audio sensors. For example, the electronic device 100 includes a first audio sensor with a first level of sensitivity for detecting the utterance 122 and a second audio sensor with a second level of sensitivity for detecting the environmental sound 124.

Figure 1C:
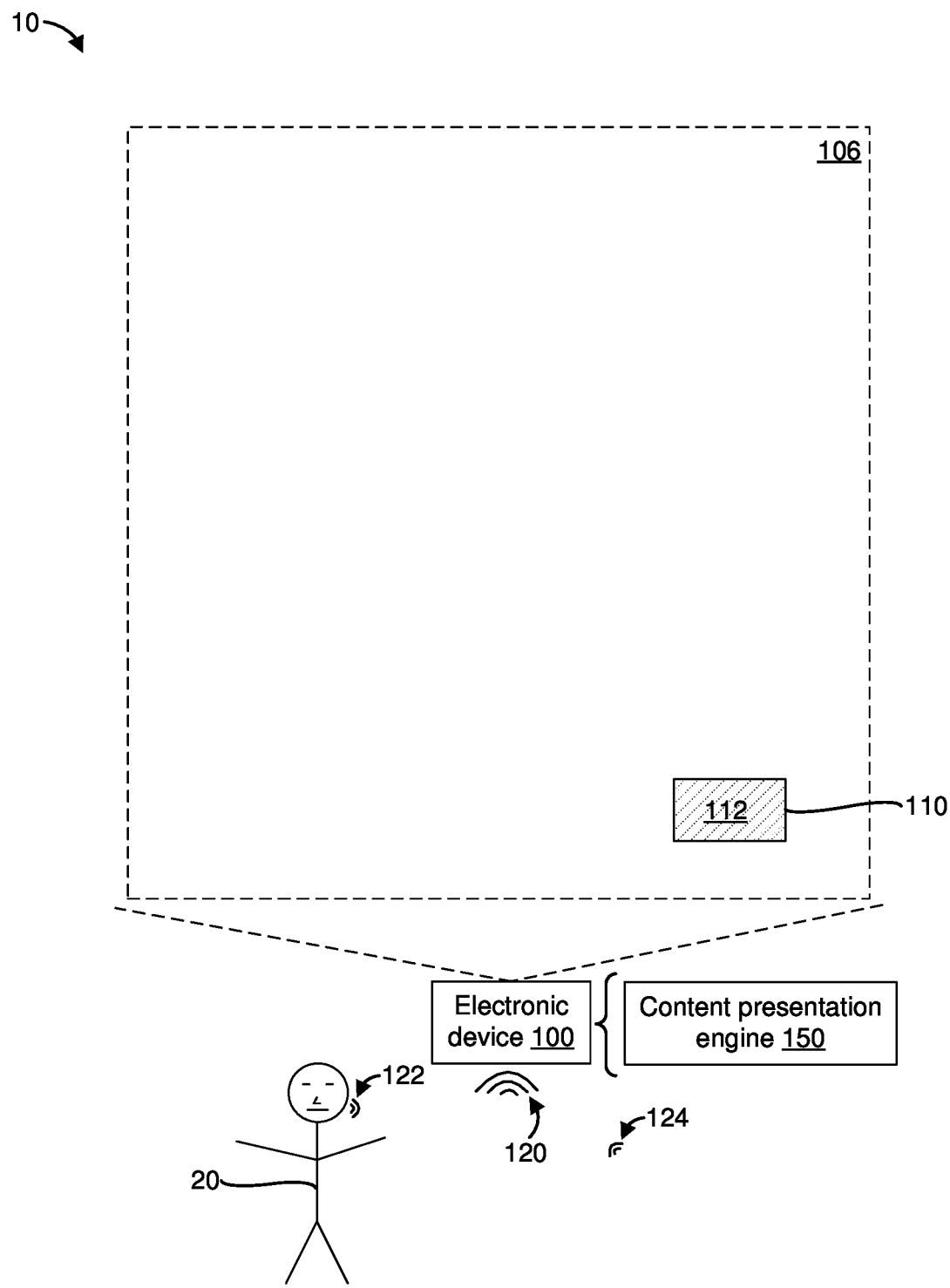

Referring to FIG. 1C, in various implementations, the content presentation engine 150 modifies a visual property of the XR environment 106 based on the sound 120 (e.g., based on the utterance 122 and/or the environmental sound 124). In various implementations, the content presentation engine 150 modifies a visual property of a virtual object in the XR environment 106 based on the sound 120. In the example of FIG. 1C, the content presentation engine 150 modifies a visual property 112 of the motorcycle object 110 based on the sound 120.

In various implementations, the content presentation engine 150 modifies the visual property of the XR environment 106 in order to provide an appearance that the XR environment 106 is generating the sound 120 or another sound that corresponds to the sound 120. In some implementations, the content presentation engine 150 modifies a visual property of a virtual object in the XR environment 106 in order to provide an appearance that the virtual object is generating the sound 120 or another sound that corresponds to the sound 120. In some implementations, the content presentation engine 150 modifies the visual property 112 of the motorcycle object 110 in order to provide an appearance that the motorcycle object 110 is generating the sound 120 or another sound that is within a similarity threshold of the sound 120. For example, if the utterance 122 includes the user 20 saying "vroom vroom" or the environmental sound 124 includes the sound of a motorcycle engine revving, then the content presentation engine 150 modifies the visual property 112 of the motorcycle object 110 in order to provide an appearance that the motorcycle object 110 is making a sound that corresponds to revving-up a motorcycle engine.

In some implementations, the content presentation engine 150 modifies the visual property 112 of the motorcycle object 110 by changing a color of at least a portion of the motorcycle object 110 based on the sound 120. For example, in some implementations, the content presentation engine 150 changes a color of an engine portion of the motorcycle object 110 to red in order to provide an appearance that the motorcycle object 110 is being revved-up and is running hot in response to the user 20 uttering "vroom vroom" or the environmental sound 124 including the sound of a motorcycle engine revving.

In some implementations, the content presentation engine 150 modifies the visual property 112 of the motorcycle object 110 by moving a component of the motorcycle object 110 based on the sound 120. For example, in some implementations, the content presentation engine 150 spins a rear wheel of the motorcycle object 110 in order to provide an appearance that an accelerator control of the motorcycle object 110 is being pressed in response to the user 20 uttering "vroom vroom" or the environmental sound 124 including the sound of a motorcycle engine revving.

Figure 1D:
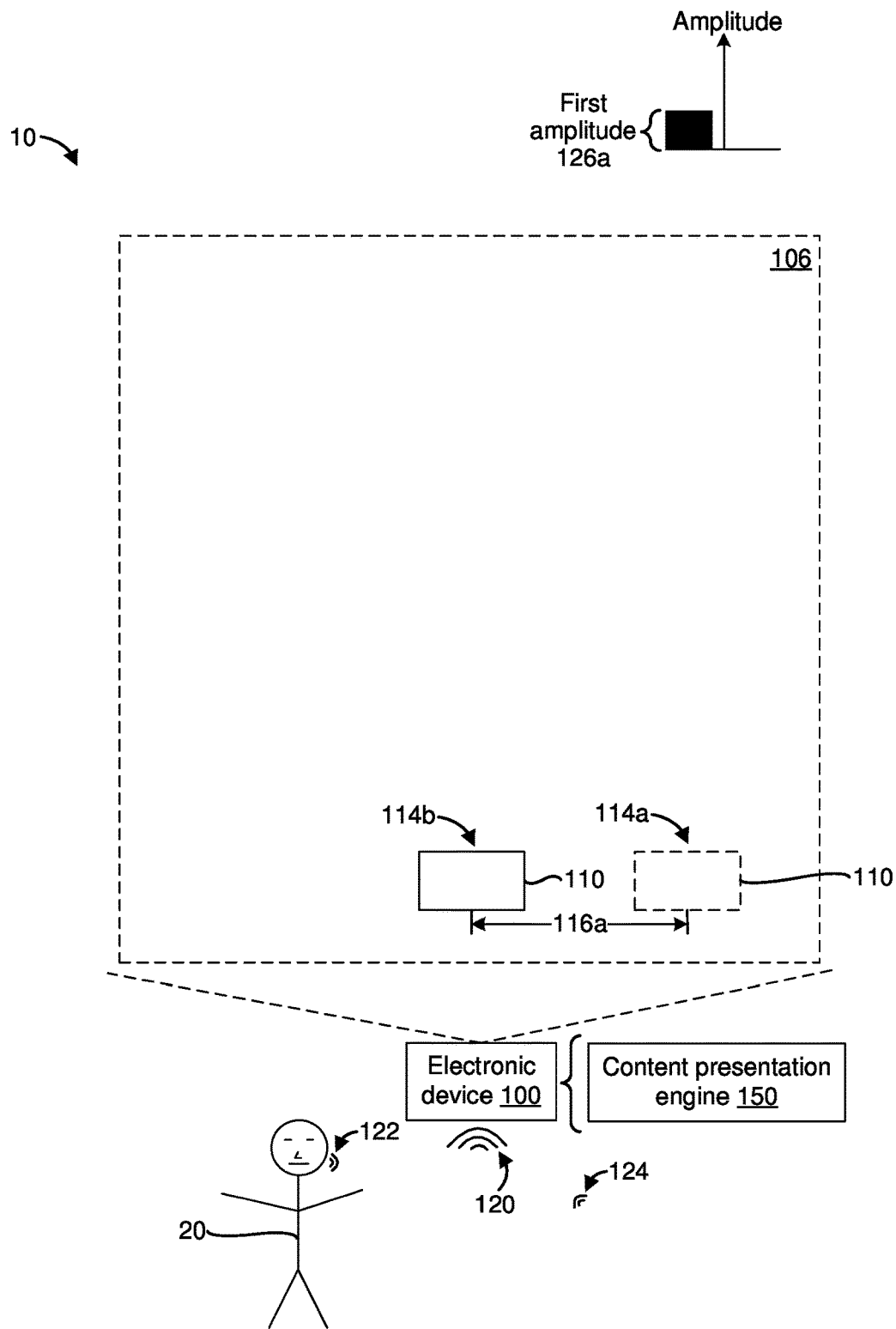

Referring to FIG. 1D, in various implementations, the content presentation engine 150 modifies a visual property of a virtual object by moving the virtual object within the XR environment 106 based on the sound 120. In the example of FIG. 1D, the content presentation engine 150 displays a movement of the motorcycle object 110 from a first position 114a within the XR environment 106 to a second position 114b within the XR environment 106. In various implementations, displaying a movement of a virtual object based on the sound 120 provides an appearance that the virtual object is generating the sound 120 while moving. For example, displaying the movement of the motorcycle object 110 in response to the user 20 uttering "vroom vroom" or the environmental sound 124 including the sound of a motorcycle engine revving provides an appearance that the motorcycle object 110 is generating the revving sound as the motorcycle object 110 moves.

In some implementations, the content presentation engine 150 moves a virtual object by a distance that is a function of an audio characteristic of the sound 120. In some implementations, the distance is a function of an amplitude of the sound 120. In the example of FIG. 1D, the content presentation engine 150 moves the motorcycle object 110 by a first distance 116a that is a function of a first amplitude 126a of the sound 120. In some implementations, the distance is a function of a frequency of the sound 120. In some implementations, the distance is a function of a tone associated with the sound 120 (e.g., a level of urgency associated with the utterance 122).

Figure 1E:
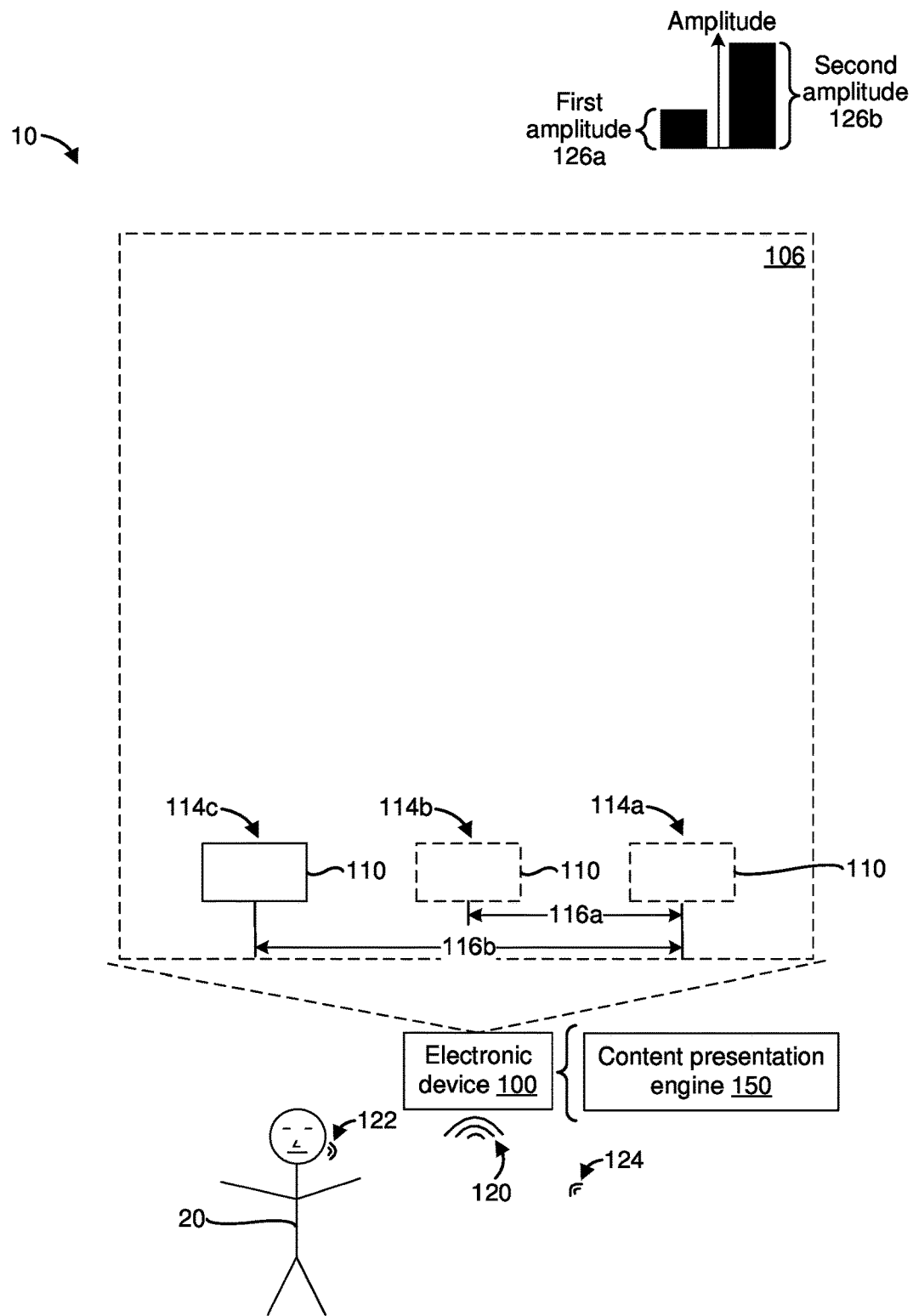

Referring to FIG. 1E, in some implementations, the content presentation engine 150 moves a virtual object by a distance that is proportional to an amplitude of the sound 120. In the example of FIG. 1E, the sound 120 is associated with a second amplitude 126b that is greater than the first amplitude 126a. Based on the second amplitude 126b, the content presentation engine 150 moves the motorcycle object 110 by a second distance 116b that is greater than the first distance 116a that was based on the first amplitude 126a. As such, in the example of FIG. 1E, the content presentation engine 150 moves the motorcycle object 110 to a third position 114c.

Figure 1F:
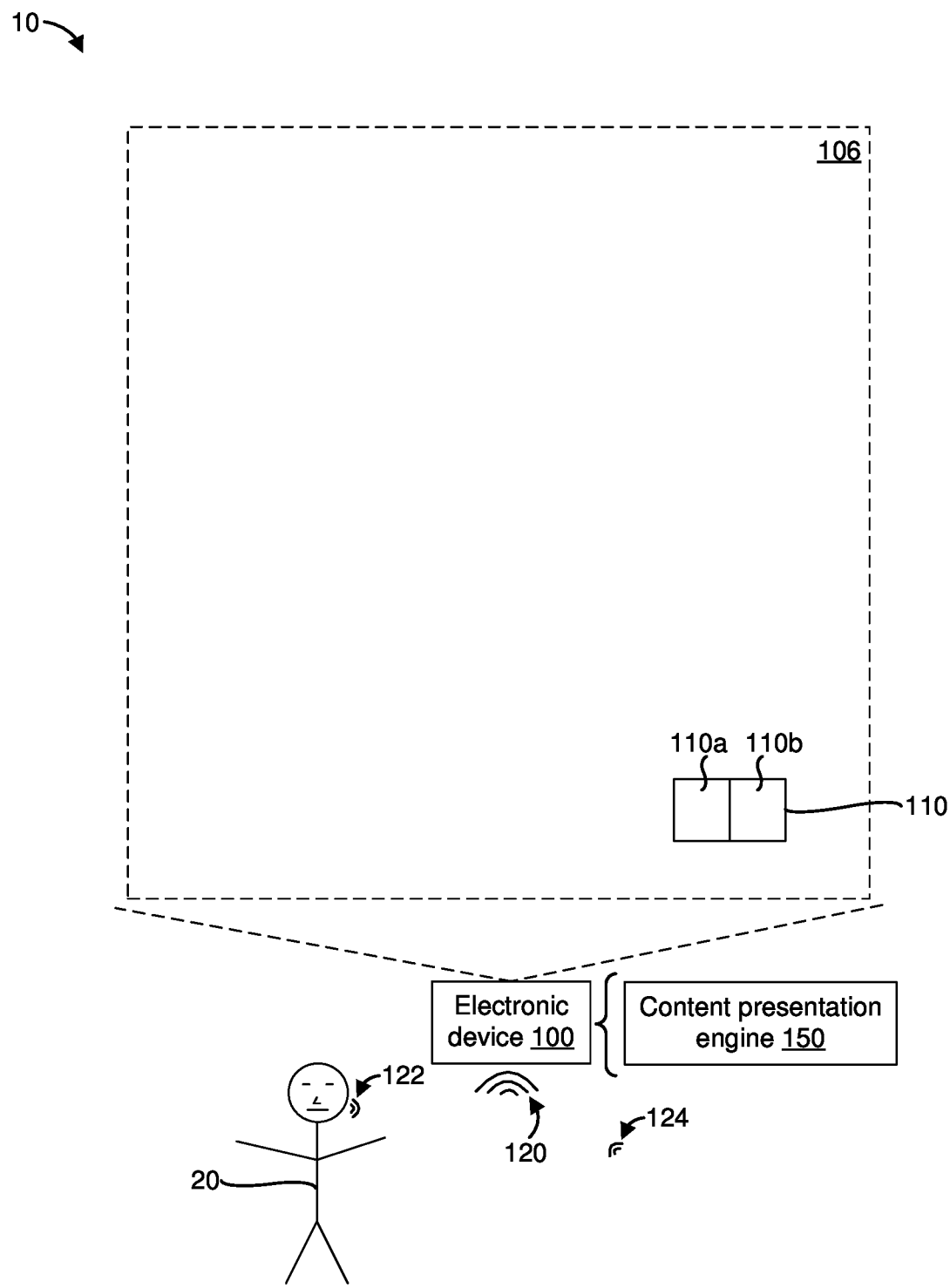

Referring to FIG. 1F, in some implementations, the motorcycle object 110 includes various components. For example, the motorcycle object 110 includes an engine 110a and a handlebar 110b. The motorcycle object 110 may include additional components that are not shown. For example, the motorcycle object 110 may include a seat, wheels, etc. In some implementations, respective positions of the various components of the motorcycle object 110 represent a state of the motorcycle object 110. In such implementations, the content presentation engine 150 can change a state of the motorcycle object 110 by moving one of the components of the motorcycle object 110.

Figure 1G:
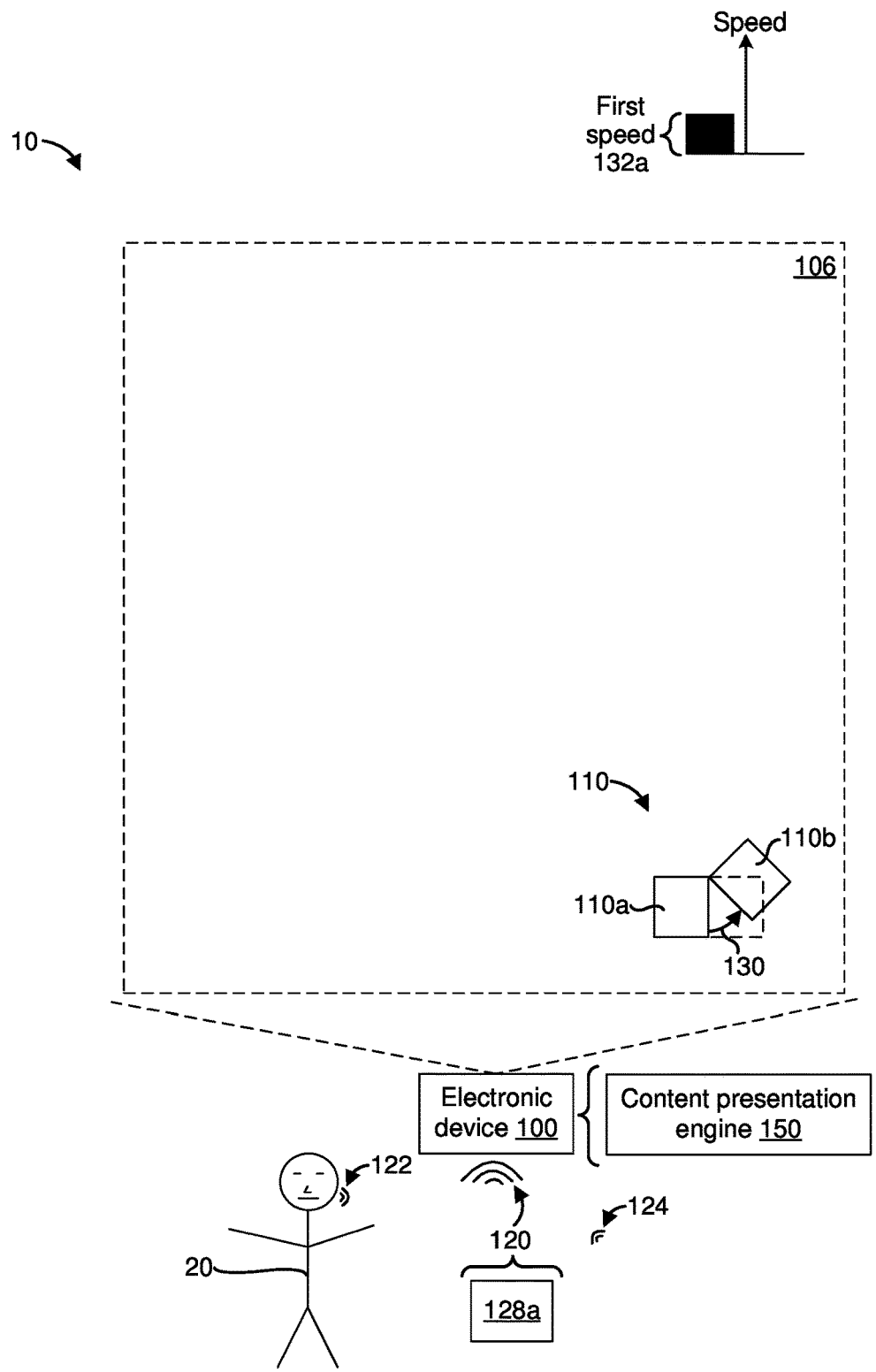

Referring to FIG. 1G, in some implementations, the content presentation engine 150 modifies a visual property of a virtual object by displaying a change in a state of the virtual object. In the example of FIG. 1G, the content presentation engine 150 modifies a visual property of the motorcycle object 110 by displaying a state change 130 that includes twisting the handlebar 110b. In some implementations, the content presentation engine 150 twists the handlebar 110b in response to the utterance 122 being "turn".

In some implementations, the content presentation engine 150 displays the state change 130 at a first speed 132a. For example, the content presentation engine 150 displays a movement of the handlebar 110b rotating at the first speed 132a. In some implementations, a speed at which the content presentation engine 150 performs the state change 130 is a function of an audio characteristic of the sound 120 (e.g., the utterance 122). In some implementations, the speed at which the content presentation engine 150 performs the state change 130 is a function of a tone associated with the utterance 122. In the example of FIG. 1G, the first speed 132a is a function of a first tone 128a associated with the sound 120 (e.g., with the utterance 122). In some implementations, the speed of the state change 130 is proportional to an urgency level of the utterance 122. In the example of FIG. 1G, the first tone 128a may correspond to the user 20 uttering "turn" with a calm demeanor (e.g., the utterance 122 is associated with an amplitude that is lower than a threshold amplitude and the utterance 122 is uttered over a time period that exceeds a threshold time period).

Figure 1H:
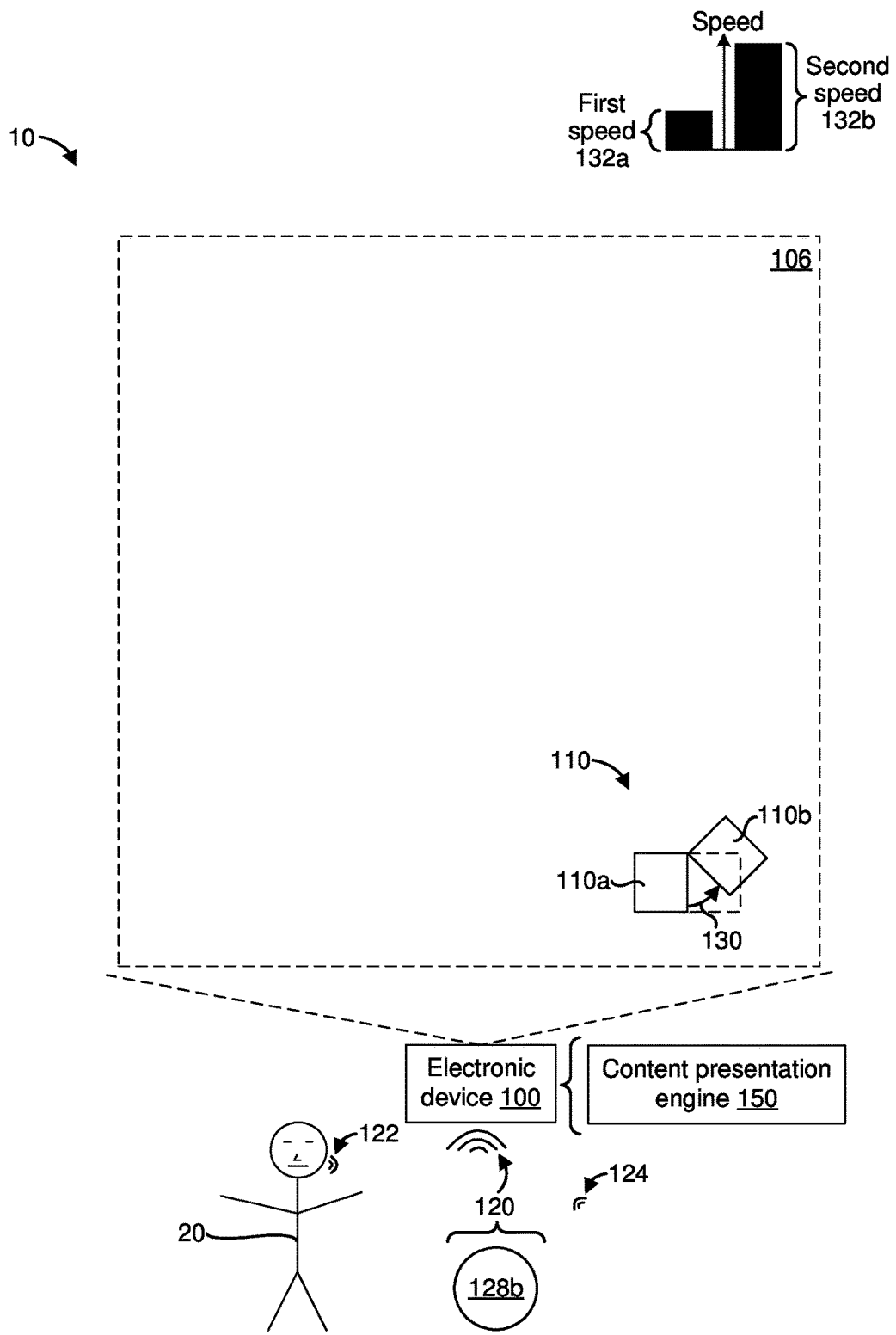

Referring to FIG. 1H, the content presentation engine 150 displays the state change 130 at a second speed 132b that is greater than the first speed 132a in response to the sound 120 (e.g., the utterance 122) being associated with a second tone 128b that is different from the first tone 128a (shown in FIG. 1G). In some implementations, the second tone 128b is associated with a level of urgency that is greater than the first tone 128a shown in FIG. 1G. For example, the second tone 128b may correspond to the user 20 uttering "turn" as an urgent request (e.g., the utterance 122 is associated with an amplitude that is greater than a threshold amplitude and the utterance 122 is uttered over a time period that is less than a threshold time period).

Figure 1I:
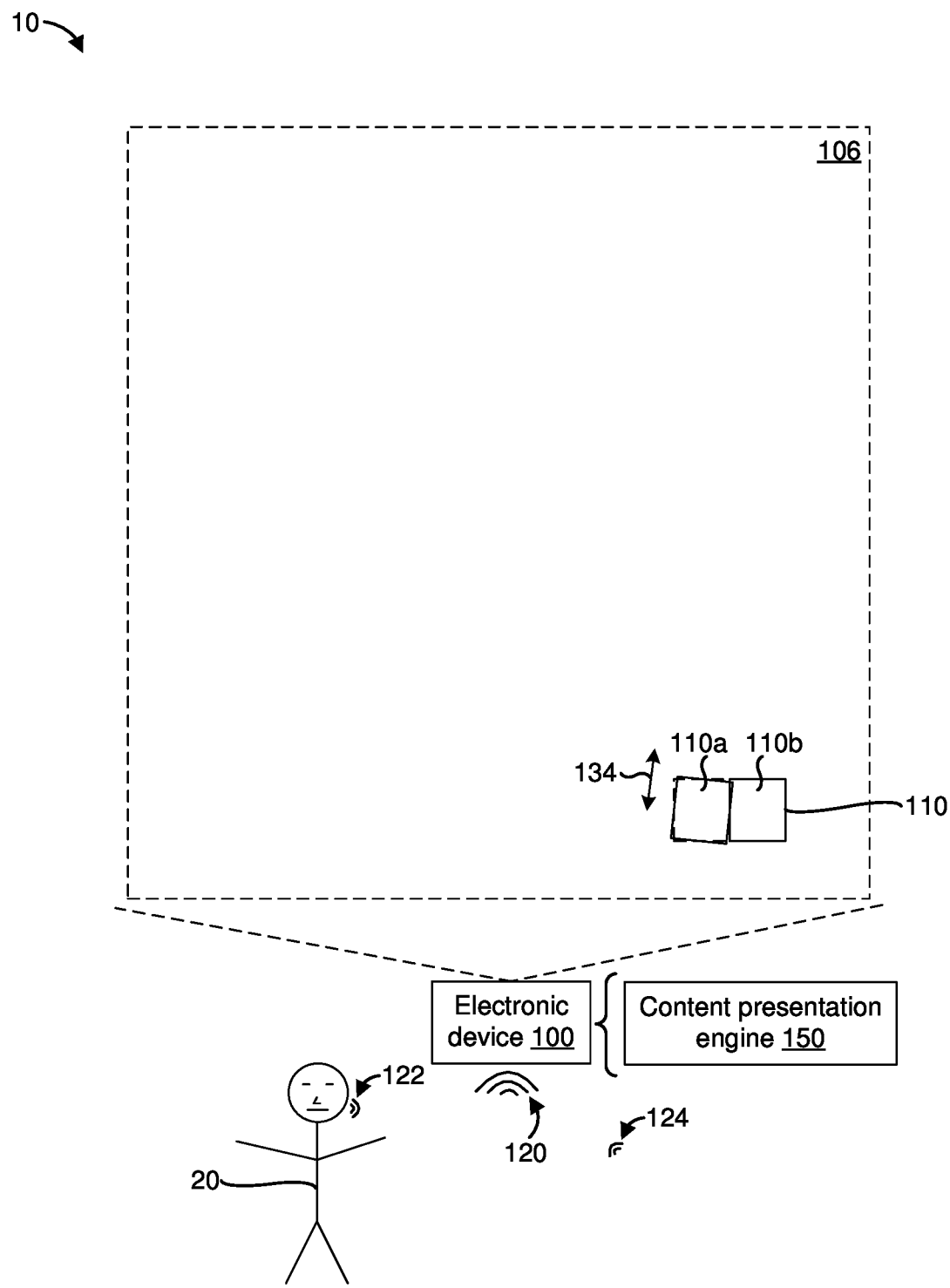

Referring to FIG. 1I, in some implementations, the content presentation engine 150 modifies a visual property of a virtual object by displaying a repetitive movement (e.g., a vibrational movement) of at least a portion (e.g., a component) of the virtual object. In the example of FIG. 1I, the content presentation engine 150 displays a vibrational movement 134 of the engine 110a in order to provide an appearance that the engine 110a is vibrating. In some implementations, displaying the vibrational movement 134 of the engine 110a provides an appearance that the motorcycle object 110 is generating the sound 120. For example, displaying the vibrational movement 134 of the engine 110a provides an appearance that the engine 110a is vibrating as the motorcycle object 110 simulates a physical motorcycle that is being revved-up.

Figure 1J:
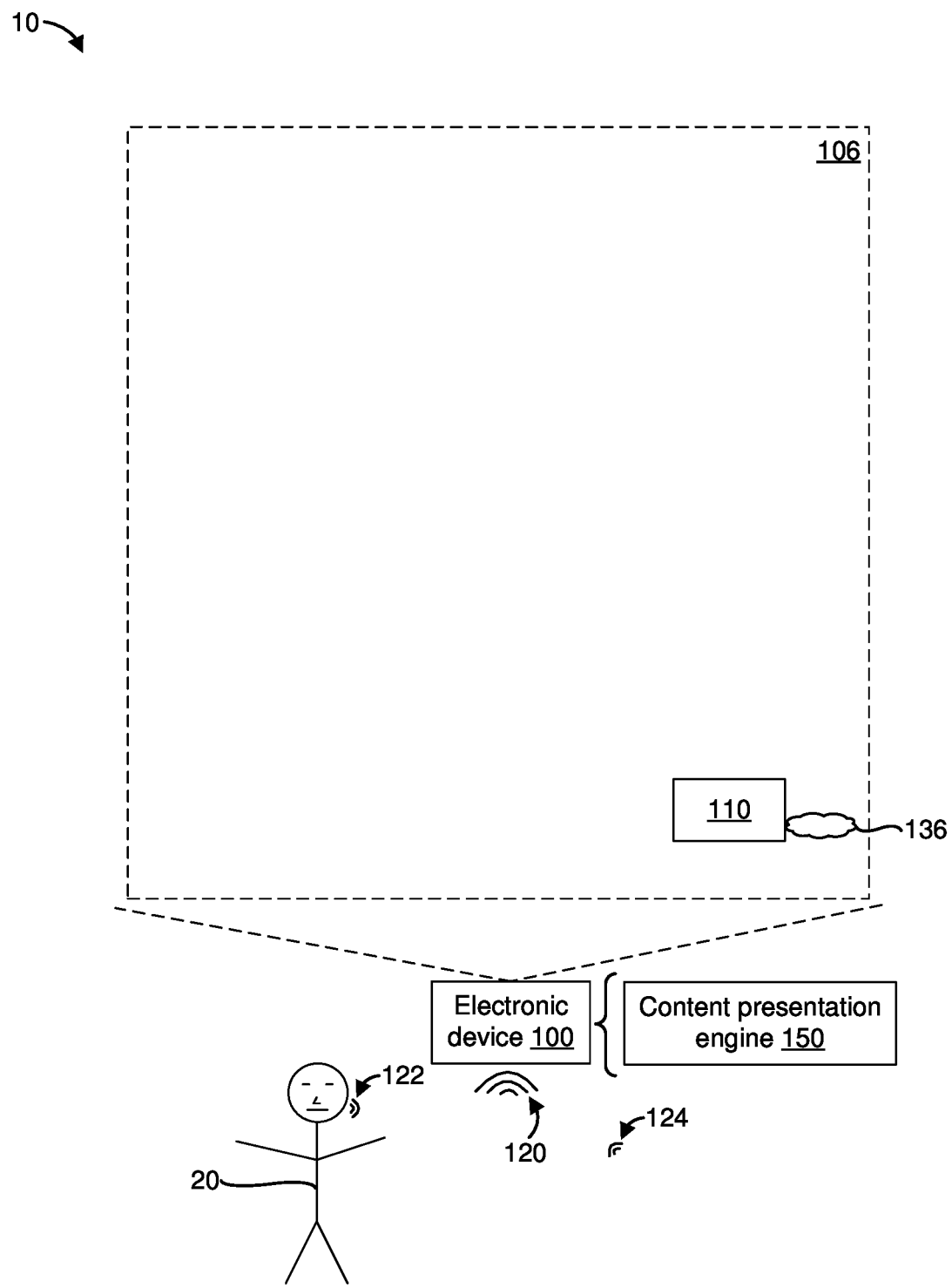

Referring to FIG. 1J, in some implementations, the content presentation engine 150 modifies a visual property of a virtual object by displaying another virtual object in association with the virtual object. In the example of FIG. 1J, the content presentation engine 150 displays graphical smoke 136 (e.g., a graphical representation of smoke, for example, an XR representation of smoke) adjacent to an exhaust component of the motorcycle object 110 in order to provide an appearance that the graphical smoke 136 is coming out of the motorcycle object 110. In some implementations, the graphical smoke 136 is referred to as virtual smoke or XR smoke. In some implementations, a visual property of the graphical smoke 136 is a function of an audio characteristic of the sound 120. For example, a size of the graphical smoke 136 is proportional to an amplitude of the sound 120. As such, in some implementations, the motorcycle object 110 appears to emit more smoke as the sound 120 gets louder. In some implementations, the content presentation engine 150 selects the othXR object (e.g., the graphical smoke 136) from an object datastore.

Figure 1K:
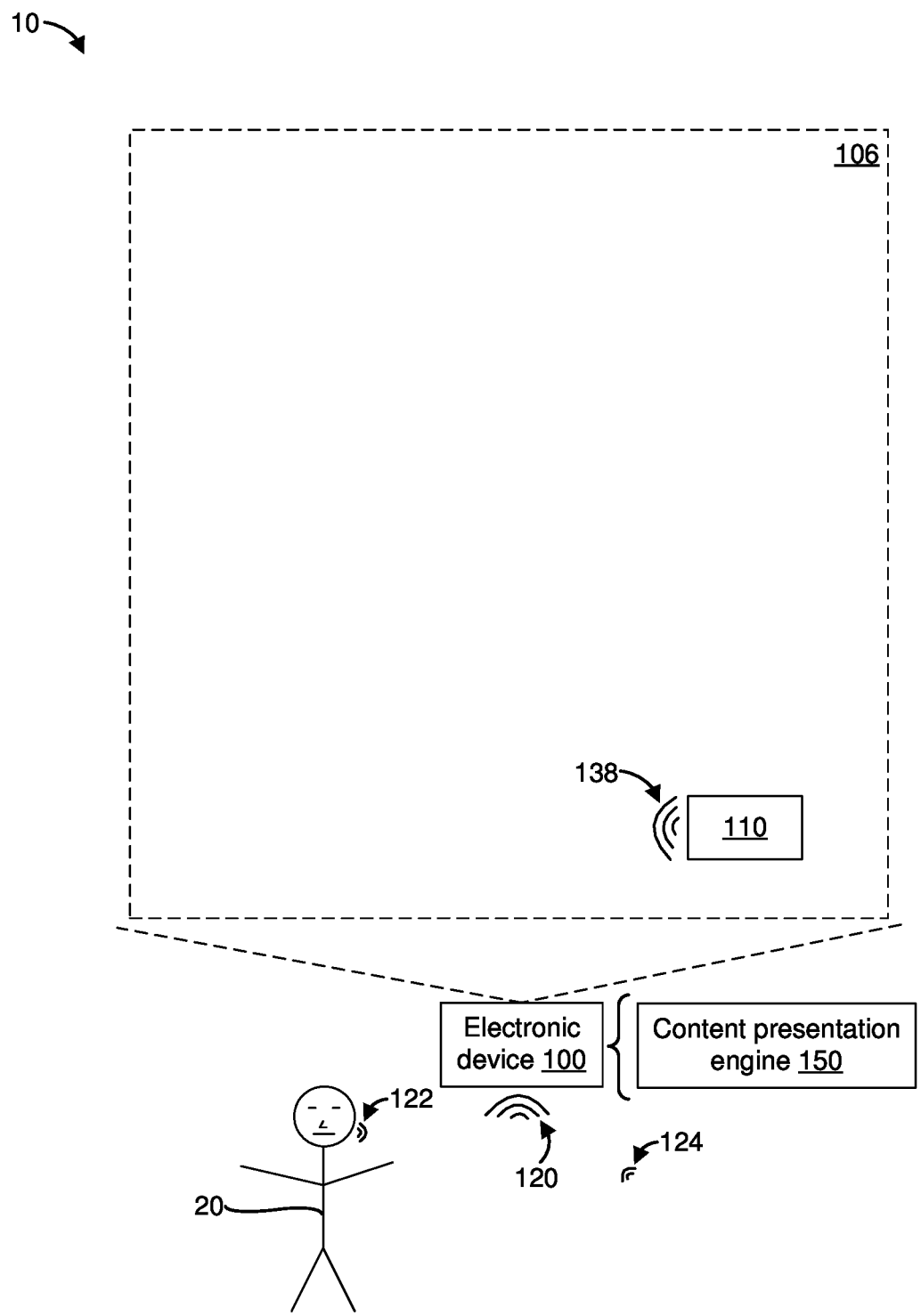

Referring to FIG. 1K, in some implementations, the content presentation engine 150 modifies the XR environment 106 to generate a sound that corresponds to the sound 120 detected from the physical environment of the electronic device 100. In the example of FIG. 1K, the content presentation engine 150 modifies the XR environment 106 in order to provide an appearance that the motorcycle object 110 is generating a sound 138 that corresponds to the sound 120. As an example, the content presentation engine 150 causes the electronic device 100 to play the sound of a motorcycle engine revving in response to the user 20 uttering "vroom vroom".

In some implementations, the content presentation engine 150 modifies a visual property of the XR environment 106 in order to provide an appearance that an environment of the XR environment 106 is generating the sound 120 (e.g., the environmental sound 124). For example, if the environmental sound 124 corresponds to rain, then the content presentation engine 150 modifies an environment of the XR environment 106 to display raindrops falling in the XR environment 106. As another example, if the utterance 122 includes a sound that imitates the sound of thunder, then the content presentation engine 150 displays lightning bolts in the XR environment 106.

Figure 1L:
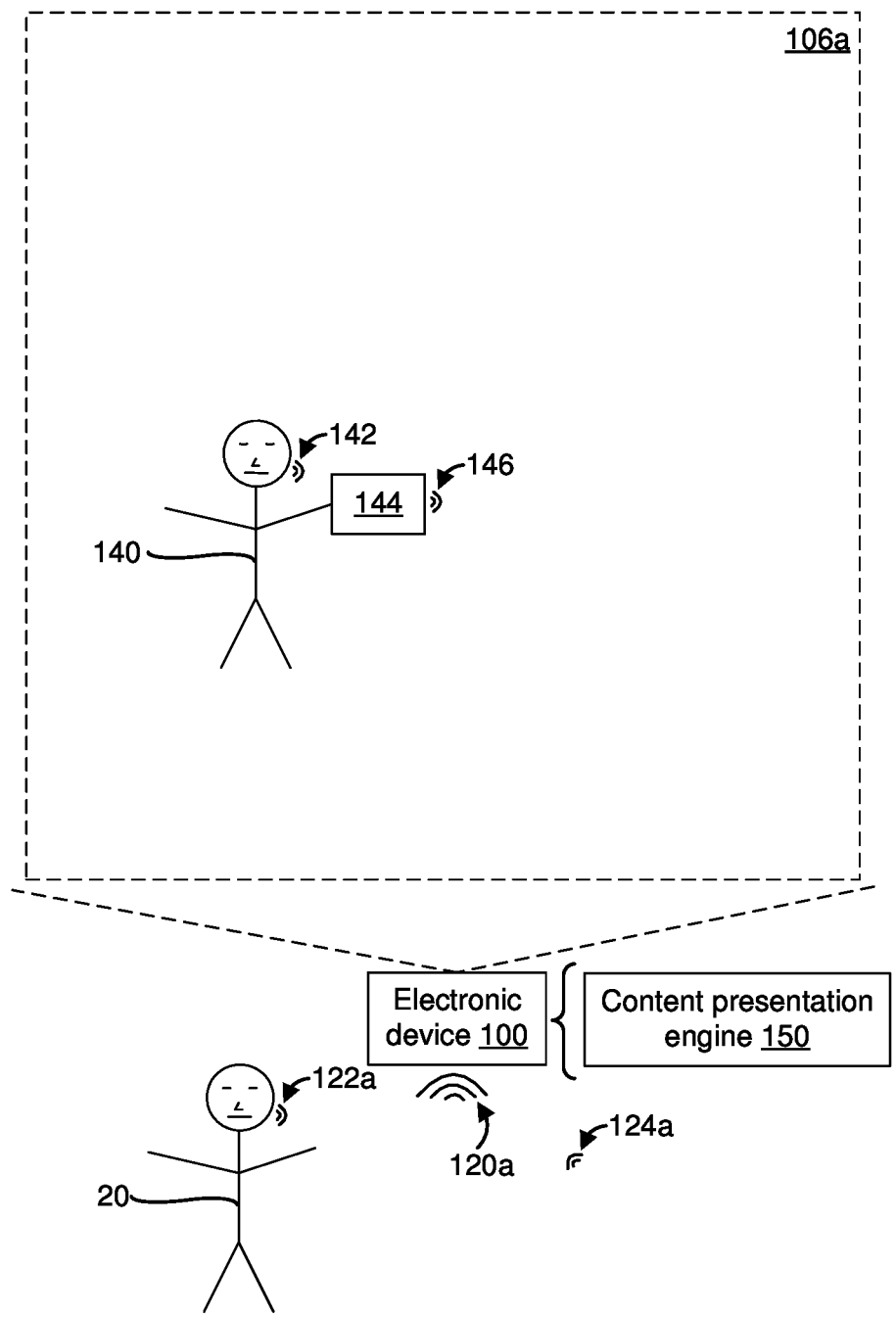

FIG. 1L illustrates another example XR environment 106a. In some implementations, the content presentation engine 150 detects a sound 120a from the physical environment of the electronic device 100. In some implementations, the sound 120a includes an utterance 122a that corresponds to the user 20 singing lyrics of a song. Additionally or alternatively, in some implementations, the sound 120a includes an environmental sound 124a that corresponds to musical notes of a song (e.g., music from a musical instrument such as a guitar or a piano).

In some implementations, the content presentation engine 150 displays a graphical person 140 (e.g., a graphical representation of a person) in the XR environment 106a. In some implementations, the graphical person 140 is referred to as an XR representation of a person (e.g., an XR person). In some implementations, the sound 120a corresponds to a particular song, and the graphical person 140 represents a singer of that particular song. In some implementations, an appearance of the graphical person 140 is within a similarity threshold of an appearance of the singer. In some implementations, if the song was sung by a band (e.g., a group of people), then the graphical person 140 represents a lead singer of the band. In some implementations, if the song was sung by a band, the content presentation engine 150 displays respective graphical representations of each of the band members.

In some implementations, the content presentation engine 150 causes the electronic device 100 to output a sound 142. In such implementations, the content presentation engine 150 concurrently manipulates a mouth portion of the graphical person 140 in order to provide an appearance that the graphical person 140 is uttering the sound 142. In some implementations, the sound 142 is an accompaniment to the utterance 122a (e.g., the sound 142 is an accompaniment to the lyrics that the user 20 is uttering). In some implementations, the sound 142 includes portions of the lyrics that the user 20 is not singing.

In some implementations, the content presentation engine 150 displays a graphical instrument 144 (e.g., a graphical representation of a musical instrument). In some implementations, the graphical instrument 144 is referred to as an XR representation of a musical instrument (e.g., an XR instrument). In some implementations, the graphical instrument 144 represents a musical instrument such as a guitar, a harmonica, a violin, a saxophone, a clarinet, drums, a piano, etc.

In some implementations, the content presentation engine 150 causes the electronic device 100 to output a musical sound 146. In such implementations, the content presentation engine 150 concurrently manipulates the graphical person 140 and the graphical instrument 144 in order to provide an appearance that the graphical person 140 is playing the graphical instrument 144 and the graphical instrument 144 is generating the musical sound 146. In some implementations, the musical sound 146 is an accompaniment to the utterance 122a (e.g., the musical sound 146 includes music that accompanies the lyrics that the user 20 is uttering). In some implementations, the musical sound 146 is an accompaniment to the environmental sound 124a (e.g., the environmental sound 124a represents music from a first musical instrument such as a piano and the musical sound 146 represents music from a second musical instrument such as a guitar). In some implementations, the user 20 is singing the lyrics of a song, and the graphical person 140 is playing musical notes that accompany the lyrics of the song. In some implementations, the musical sound 146 includes portions of the musical notes that the environmental sound 124a does not include. For example, if the environmental sound 124a corresponds to piano notes of the song, then the musical sound 146 may correspond to guitar notes of the song.

Figure 2:
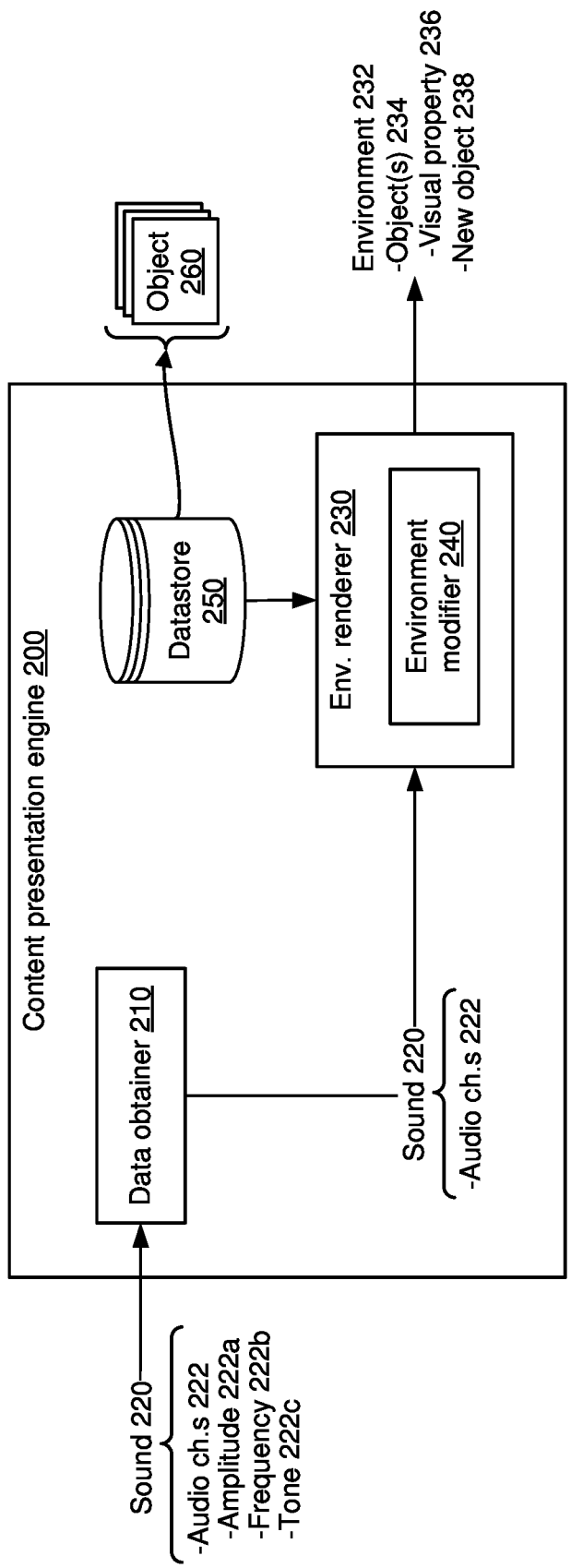
FIG. 2 is a block diagram of a content presentation engine in accordance with some implementations.

FIG. 2 illustrates a block diagram of a content presentation engine 200 in accordance with some implementations. In some implementations, the content presentation engine 200 implements the content presentation engine 150 shown in FIGS. 1A-1L. In various implementations, the content presentation engine 200 includes a data obtainer 210, an XR environment renderer 230, an XR environment modifier 240 and a datastore 250 that stores various objects 260 (e.g., XR objects, for example, graphical objects).

In various implementations, the data obtainer 210 obtains a sound 220 (e.g., the sound 120 shown in FIGS. 1B-1K, or the sound 120a shown in FIG. 1L). In some implementations, the data obtainer 210 obtains the sound 220 via an audio sensor (e.g., a microphone). In various implementations, the sound 220 is associated with (e.g., characterized by) a set of one or more audio characteristics 222. For example, in some implementations, the sound 220 is characterized by an amplitude 222a, a frequency 222b or a tone 222c.

In some implementations, the XR environment renderer 230 renders an XR environment 232 (e.g., the XR environment 106 shown in FIGS. 1A-1K, or the XR environment 106a shown in FIG. 1L). In some implementations, the XR environment 232 includes one or more XR objects 234 (e.g., the motorcycle object 110 shown in FIGS. 1A-1K). In some implementations, an XR object 234 is associated with a visual property 236. In some implementations, the visual property 236 of the XR object 234 includes a color of the XR object 234. In some implementations, the visual property 236 of the XR object 234 includes a position of the XR object 234 within the XR environment 232. In some implementations, the visual property 236 of the XR object 234 includes a state of the XR object 234 (e.g., a position of various components of the XR object 234 relative to each other).

In various implementations, the XR environment modifier 240 modifies the XR environment 232 based on the sound 220. In some implementations, the XR environment modifier 240 modifies a visual property 236 of an XR object 234 based on the audio characteristics 222 of the sound 220. For example, in some implementations, the XR environment modifier 240 modifies the visual property 112 of the motorcycle object 110 shown in FIG. 1C. In some implementations, the XR environment modifier 240 modifies the visual property 236 of the XR object 234 by changing a color of at least a portion of the XR object 234 in order to provide an appearance the XR object 234 is generating the sound 220 (e.g., by changing a color of the engine 110a shown in FIG. 1F from blue to red in order to indicate that an engine of the motorcycle object 110 is turned on).

In some implementations, the XR environment modifier 240 modifies the visual property 236 of the XR object 234 by changing a shape of the XR object 234. In some implementations, the XR environment modifier 240 modifies the visual property 236 of the XR object 234 by changing a dimension of the XR object 234. For example, the XR environment modifier 240 increases a size of the XR object 234 in order to provide an appearance that the XR object 234 is generating the sound 220. In some implementations, the change in the dimension of the XR object 234 is a function of the audio characteristics 222 of the sound 220. For example, in some implementations, an increase in the dimension of the XR object 234 is proportional to the amplitude 222a of the sound 220.

In some implementations, the XR environment modifier 240 modifies the visual property 236 of the XR object 234 by displaying a movement of the XR object 234 within the XR environment 232. For example, the XR environment modifier 240 displays the movement of the motorcycle object 110 from the first position 114a to the second position 114b based on the sound 120 shown in FIG. 1D. In some implementations, the XR environment modifier 240 moves the XR object 234 by a distance that is based on the audio characteristics 222 of the sound 220. As illustrated in FIGS. 1D and 1E, in some implementations, the distance is proportional to the amplitude 222a of the sound 220.

In some implementations, the XR environment modifier 240 modifies the visual property 236 of the XR object 234 by displaying a state change in the XR object 234. In some implementations, the XR environment modifier 240 displays the state change by moving a first portion (e.g., a first component) of the XR object 234 while maintaining a position of a second portion (e.g., a second component) of the XR object 234. For example, the XR environment modifier 240 displays the state change 130 in the motorcycle object 110 shown in FIG. 1G. In some implementations, a speed at which the XR environment modifier 240 displays the state change is a function of the audio characteristics 222 of the sound 220. In some implementations, the speed at which the XR environment modifier 240 displays the state change is a function of the amplitude 222a of the sound 220. In some implementations, the speed at which the XR environment modifier 240 displays the state change is a function of the frequency 222b of the sound 220. In some implementations, the speed at which the XR environment modifier 240 displays the state change is a function of the tone 222c of the sound 220 (e.g., as illustrated in FIGS. 1G and 1H).

In some implementations, the XR environment modifier 240 modifies the visual property 236 of the XR object 234 by displaying a repetitive movement (e.g., a vibrational movement at a varying speed, or an oscillation at a constant speed) of at least a portion of the XR object 234 in order to provide an appearance that the XR object 234 is generating the sound 220. For example, as illustrated in FIG. 1I, in some implementations, the XR environment modifier 240 displays the vibrational movement 134 of the engine 110a of the motorcycle object 110.

In some implementations, the XR environment modifier 240 modifies the visual property 236 of the XR object 234 by displaying another XR object (e.g., a new XR object 238) in association with the XR object 234. For example, as illustrated in FIG. 1J, the XR environment modifier 240 displays the graphical smoke 136 adjacent to the motorcycle object 110. In some implementations, the XR environment modifier 240 displays the other XR object in order to provide an appearance that the XR object 234 has generated the other XR object (e.g., displaying the graphical smoke 136 adjacent to an exhaust component of the motorcycle object 110 in order to provide an appearance that the graphical smoke 136 is coming out of the exhaust component of the motorcycle object 110). In some implementations, the XR environment modifier 240 retrieves the other XR object from the datastore 250 that stores various XR objects 260. In some implementations, a visual property (e.g., a dimension, a color or a position) of the new XR object 238 is a function of the audio characteristics 222 of the sound 220. For example, as described in relation to FIG. 1J, in some implementations, the XR environment modifier 240 sets a dimension or a color of the graphical smoke 136 based on an amplitude of the sound 120.

In some implementations, the XR environment modifier 240 modifies the visual property 236 of the XR object 234 by playing another sound that corresponds to the sound 220. In such implementations, the XR environment modifier 240 manipulates the XR object 234 in order to provide an appearance that the XR object 234 is generating the other sound. For example, the XR environment modifier 240 causes the electronic device 100 to output the sound 138 shown in FIG. 1K and the XR environment modifier 240 manipulates the motorcycle object 110 in order to provide an appearance that the motorcycle object 110 is generating the sound 138.

In some implementations, the XR environment modifier 240 displays a new XR object 238 in the XR environment 232 based on the sound 220. In some implementations, the new XR object 238 includes an XR representation of a person (e.g., the graphical person 140 shown in FIG. 1L). In some implementations, the XR environment modifier 240 causes the electronic device 100 to output another sound, and the XR environment modifier 240 manipulates the new XR object 238 in order to provide an appearance that the new XR object 238 is generating the other sound (e.g., the sound 142 shown in FIG. 1L). In some implementations, the other sound is an accompaniment to the sound 220. For example, if the sound 220 corresponds to a first portion of lyrics to a song, then the other sound corresponds to a second portion of the lyrics to the song. In some implementations, the new XR object 238 includes an XR representation of a musical instrument (e.g., the graphical instrument 144 shown in FIG. 1L), and the other sound correspond to musical notes being played (e.g., the other sound corresponds to the musical sound 146 shown in FIG. 1L).

In some implementations, the XR environment 232 includes multiple XR objects 234. In some implementations, the XR environment modifier 240 determines which of the XR objects 234 are to be modified based on the sound 220. In some implementations, the XR environment modifier 240 identifies a subset of the XR objects 234 that are capable of generating a sound that is within a similarity threshold of the sound 220. In such implementations, the XR environment modifier 240 modifies the visual properties of the subset of the XR objects 234 that are capable of generating a sound similar to the sound 220, and the XR environment modifier 240 forgoes modifying the remaining XR objects 234 that are not capable of generating a sound similar to the sound 220. As an example, the XR environment 232 may include a motorcycle object (e.g., the motorcycle object 110 shown in FIGS. 1A-1K), a table object and a chair object. In this example, if the sound 220 includes a "vroom vroom" utterance, then the XR environment modifier 240 may modify the visual property 236 of the motorcycle object because the motorcycle object is capable of generating a sound that is similar to the "vroom vroom" utterance. However, in this example, the XR environment modifier 240 may forgo modifying the table object and chair object because the table object and the chair object are not capable of generating a sound that is similar to the "vroom vroom" utterance.

Figure 3:
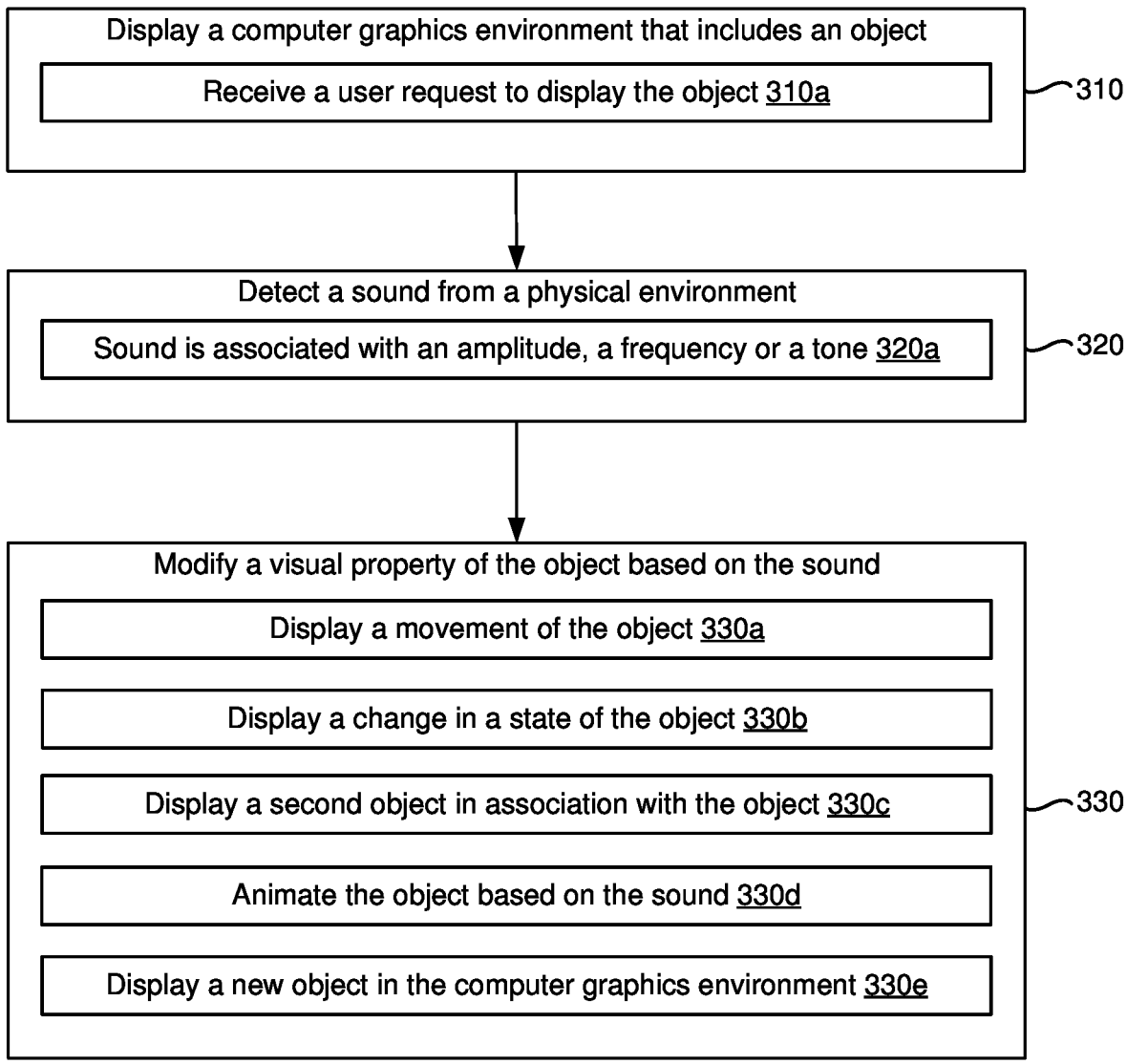
FIG. 3 is a flowchart representation of a method of modifying a computer graphics environment in accordance with some implementations.

FIG. 3 is a flowchart representation of a method 300 for modifying an XR environment based on sound from a physical environment. In various implementations, the method 300 is performed by a device (e.g., the electronic device 100 or the content presentation engine 150 shown in FIGS. 1A-1L, or the content presentation engine 200 shown in FIG. 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes displaying a computer graphics environment that includes an object. For example, as shown in FIG. 1A, the electronic device 100 (e.g., the content presentation engine 150) displays the XR environment 106 that includes the motorcycle object 110. As represented by block 310*a*, in some implementations, the method 300 includes receiving a user input that corresponds to a request to display the object. As such, in some implementations, the method 300 includes displaying the object in response to user request to display the object.

As represented by block 320, in various implementations, the method 300 includes detecting, via an audio sensor, a sound from a physical environment (e.g., a physical environment, for example, a surrounding) of the device. For example, as shown in FIG. 1B, the electronic device 100 detects the sound 120 from the physical environment of the electronic device 100. In some implementations, the sound is associated with one or more audio characteristics. For example, as shown in FIG. 2, in some implementations, the sound 220 is associated with the audio characteristics 222.

As represented by block 320*a*, in some implementations, the one or more audio characteristics of the sound include an amplitude of the sound. For example, as shown in FIG. 2, in some implementations, the sound 220 is associated with the amplitude 222*a*. In some implementations, the one or more audio characteristics of the sound include a frequency of the sound. For example, as shown in FIG. 2, in some implementations, the sound 220 is associated with the frequency 222*b*. In some implementations, the one or more audio characteristics of the sound include a tone of the sound. For example, as shown in FIG. 2, in some implementations, the sound 220 is associated with the tone 222*c*.

As represented by block 330, in some implementations, the method 300 includes modifying a visual property of the object based on the one or more audio characteristics of the sound. For example, as shown in FIG. 1C, the electronic device 100 (e.g., the content presentation engine 150) changes the visual property 112 of the motorcycle object 110 based on the sound 120. In various implementations, modifying the visual property of the object based on the sound tends to enhance a user experience of the device by making the object appear more realistic. For example, in some implementations, modifying the visual property of the object based on the sound provides an appearance that the object responds to audio stimuli from the real-world. In some implementations, modifying the visual property of the object based on the sound reduces a need for user inputs that correspond to defining behavior of the object. Reducing unnecessary user inputs tends to enhance a user experience of the device and improves a battery life of a battery-operated device.

As represented by block 330*a*, in some implementations, modifying the visual property of the object includes displaying a movement of the object from a first position in the computer graphics environment to a second position in the computer graphics environment that is different from the first position. For example, as shown in FIG. 1D, the electronic device 100 (e.g., the content presentation engine 150) displays a movement of the motorcycle object 110 from the first position 114*a* to the second position 114*b* in response to detecting the sound 120 (e.g., in response to detecting that the user 20 uttered "Go! Go! Go!"). In some implementations, a distance between the first position and the second position is a function of the one or more audio characteristics of the sound. For example, as shown in FIG. 1D, the first distance 116*a* between the first position 114*a* and the second position 114*b* is a function of the first amplitude 126*a*.

In some implementations, displaying the movement comprises displaying a first amount of movement when an amplitude of the sound is below a threshold amplitude and displaying a second amount of movement that is greater than the first amount of movement when the amplitude is greater than the threshold amplitude. For example, as shown in FIGS. 1D and 1E, the content presentation engine 150 moves the motorcycle object 110 by the first distance 116*a* when the sound 120 (e.g., the utterance 122) is associated with the first amplitude 126*a* (shown in FIG. 1D), and the content presentation engine 150 moves the motorcycle object 110 by the second distance 116*b* when the sound is associated with the second amplitude 126*b* (shown in FIG. 1E).

As represented by block 330*b*, in some implementations, modifying the visual property of the object includes displaying a change in a state of the object from a first state to a second state that is different from the first state. For example, as shown in FIG. 1G, the content presentation engine 150 displays the state change 130 in the motorcycle object 110 by twisting the handlebar 110*b* (e.g., in response to the utterance 122 being "turn").

In some implementations, the method 300 includes determining a speed at which the change in the state is displayed based on a function of the one or more audio characteristics of the sound. In some implementations, displaying the change in the state of the object includes displaying the change at a first speed when the sound is associated with a first tone and displaying the change at a second speed that is different from the first speed when the sound is associated with a second tone that is different from the first tone. For example, as shown in FIGS. 1G and 1H, the content presentation engine 150 displays the state change 130 at the first speed 132*a* when the sound 120 is associated with the first tone 128*a* (shown in FIG. 1G), and the content presentation engine 150 displays the state change 130 at the second speed 132*b* when the sound 120 is associated with the second tone 128*b* (shown in FIG. 1H).

As represented by block 330*c*, in some implementations, modifying the visual property of the object includes displaying a second object in association with the object. For example, as shown in FIG. 1J, the content presentation engine 150 displays the graphical smoke 136 adjacent to the motorcycle object 110 in order to provide an appearance that the graphical smoke 136 is coming out of the motorcycle object 110. In some implementations, the method 300 includes selecting the second object from a set of objects based on the one or more audio characteristics of the sound. For example, as shown in FIG. 2, in some implementations, the XR environment modifier 240 selects the new XR object 238 from the datastore 250.

As represented by block 330*d*, in some implementations, modifying the visual property of the object includes animating one or more components of the object in order to provide an appearance that the object is emitting the sound. For example, as shown in FIG. 1I, the content presentation engine 150 displays the vibrational movement 134 of the engine 110*a* in order to provide an appearance that the sound 120 is originating from the engine 110*a*. As another example, if the user utters "beep beep" then a horn component of the motorcycle object is shown as being depressed, or a headlight component is flashed (e.g., turned on and off several times) to provide an appearance that the sound is coming from the motorcycle object.

In some implementations, the method 300 includes determining whether the object is capable of emitting the sound and animating one or more components of the object in response to determining that the object is capable of emitting the sound. In some implementations, the method 300 includes determining whether a physical element that corresponds to the object is capable of producing the sound, and animating the object in response to determining that the corresponding physical element is capable of producing the sound. In some implementations, the method 300 includes forgoing animation of the one or more components of the object in response to determining that the object is not capable of emitting the sound.

In some implementations, the method 300 includes animating the object in order to provide an appearance that the object is generating another sound that corresponds to the sound. For example, as shown in FIG. 1K, the content presentation engine 150 modifies the motorcycle object 110 in order to provide an appearance that the motorcycle object 110 is generating the sound 138 (e.g., the sound of a physical motorcycle engine being revved-up) that corresponds to the sound 120 (e.g., the user 20 uttering "vroom vroom"). As another example, if a user is singing lyrics of a song, then the device animates a graphical representation of a guitarist to play musical notes that accompany the lyrics.

As represented by block 330*e*, in some implementations, the method 300 includes generating a new object based on the sound, displaying the new object in the computer graphics environment, animating the new object in order to provide an appearance that the new object is generating the sound. In some implementations, the new object includes a graphical representation of a person. For example, as shown in FIG. 1L, the content presentation engine 150 generates the graphical person 140 based on the sound 120*a*, displays the graphical person 140 in the XR environment 106*a*, and animates the graphical person 140 in order to provide an appearance that the graphical person 140 is generating the sound 142 (e.g., the sound 120*a*). In some implementations, the method 300 includes determining that the sound corresponds to a song, and displaying a graphical representation of an artist singing the song. In some implementations, the sound includes lyrics of a song, and the graphical representation of the person includes a graphical representation of an artist that sang the song.

In some implementations, animating the new object includes animating the graphical representation of the person in order to provide an appearance that the graphical representation of the person is uttering the sound or another sound that corresponds to the sound. For example, as shown in FIG. 1L, the content presentation engine 150 animates the graphical person 140 in order to provide an appearance that the graphical person 140 is generating the sound 142. In some implementations, the sound from the physical environment corresponds to lyrics of a song, and the device animates the graphical representation of the person in order to provide an appearance that the graphical representation of the person is singing the lyrics. In some implementations, the device animates the graphical representation of the person in order to provide an appearance that the graphical representation of the person is singing an accompaniment to the sound. For example, in some implementations, the user is singing the lyrics and the device generates a graphical representation of background singers that are singing the chorus.

In some implementations, animating the new object includes animating the graphical representation of the person in order to provide an appearance that the graphical representation of the person is playing a graphical representation of a musical instrument that is generating the sound or another sound that corresponds to the sound. For example, as shown in FIG. 1L, the content presentation engine 150 animates the graphical person 140 in order to provide an appearance that the graphical person 140 is playing the graphical instrument 144 in order to generate the musical sound 146.

In some implementations, the sound from the physical environment corresponds to musical notes being played at a physical musical instrument, and the method 300 includes animating the graphical representation of the person in order to provide an appearance that the graphical representation of the person is playing a graphical representation of a musical instrument that is generating the sound corresponding to the musical notes. In some implementations, the method 300 includes animating the graphical representation of the person in order to provide an appearance that the graphical representation of the person is playing an accompaniment to the sound from the physical environment. For example, if the sound includes piano notes then the method 300 includes generating a graphical representation of a guitarist playing accompanying guitar notes.

In some implementations, modifying the visual property of the object includes selecting the object from a plurality of objects based on an association of the object with the one or more audio characteristics of the sound. Referring to FIG. 1B, in some implementations, the electronic device 100 (e.g., the content presentation engine 150) selects the motorcycle object 110 from an object store that includes various objects in response to detecting the utterance 122.

Figure 4:
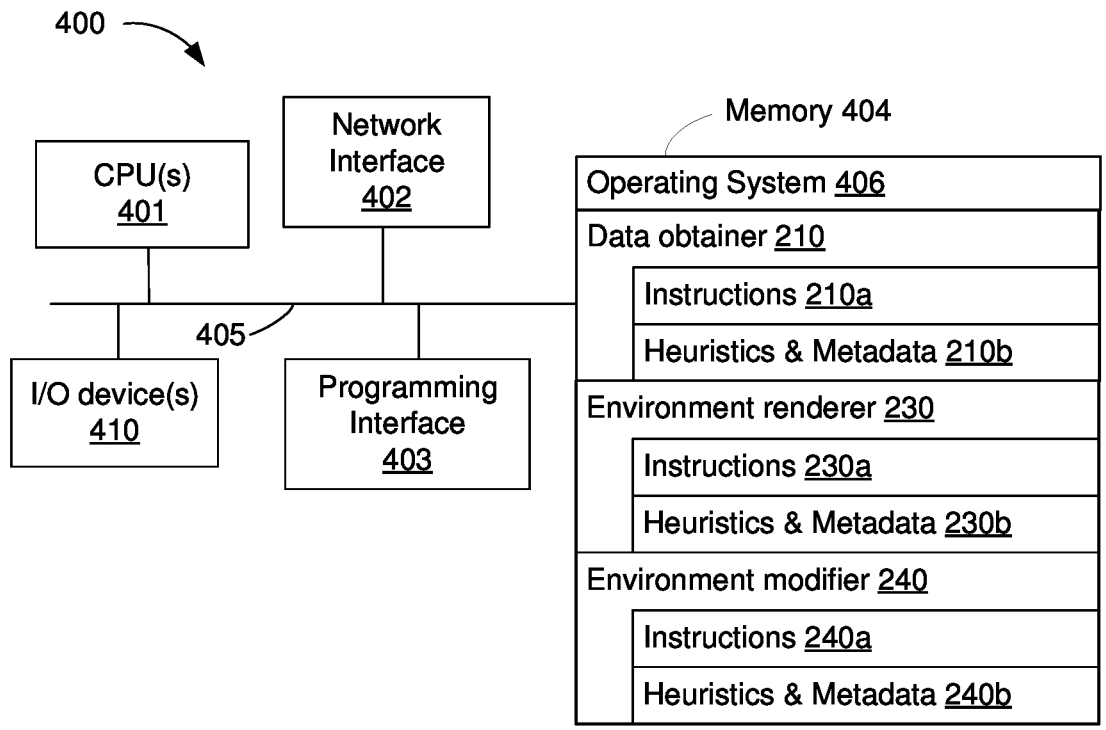
FIG. 4 is a block diagram of a device that modifies a computer graphics environment in accordance with some implementations.

FIG. 4 is a block diagram of a device 400 that modifies an XR environment based on sound from a physical environment in accordance with some implementations. In some implementations, the device 400 implements the electronic device 100 or the content presentation engine 150 shown in FIGS. 1A-1L, or the content presentation engine 200 shown in FIG. 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the data obtainer 210, the XR environment renderer 230 and the XR environment modifier 240. In various implementations, the device 400 performs the method 300 shown in FIG. 3.

In some implementations, the data obtainer 210 detects sound from a physical environment of the device 400 (e.g., the sound 120 shown in FIGS. 1B-1K, the sound 120a shown in FIG. 1L or the sound 220 shown in FIG. 2). In some implementations, the data obtainer 210 performs the operation(s) represented by block 320 in FIG. 3. To that end, the data obtainer 210 includes instructions 210a, and heuristics and metadata 210b.

In some implementations, the XR environment renderer 230 renders an XR environment (e.g., a computer graphics environment, for example, the XR environment 106 shown in FIGS. 1A-1K, the XR environment 106a shown in FIG. 1L or the XR environment 232 shown in FIG. 2). In some implementations, the XR environment renderer 230 performs the operations(s) represented by block 310 shown in FIG. 3. To that end, the XR environment renderer 230 includes instructions 230a, and heuristics and metadata 230b.

In some implementations, the XR environment modifier 240 modifies the XR environment based on sound from a physical environment of the device 400. For example, as described herein, in some implementations, the XR environment modifier 240 modifies a visual property of an object in the XR environment based on sound from the physical environment of the device 400. In some implementations, the XR environment modifier 240 performs the operation(s) represented by block 330 shown in FIG. 3. To that end, the XR environment modifier 240 includes instructions 240a, and heuristics and metadata 240b.

In some implementations, the one or more I/O devices 410 include an audio sensor (e.g., a microphone) for detecting sound from a physical environment of the device 400 (e.g., for detecting the sound 120 shown in FIGS. 1B-1K, the sound 120a shown in FIG. 1L, or the sound 220 shown in FIG. 2). In some implementations, the one or more I/O devices 410 include a display for displaying the XR environment 106 shown in FIGS. 1A-1K, the XR environment 106a shown in FIG. 1L or the XR environment 232 shown in FIG. 2. In various implementations, the one or more I/O devices 410 include a video pass-through display which displays at least a portion of a physical environment surrounding the device 400 as an image captured by a scene camera. In various implementations, the one or more I/O devices 410 include an optical see-through display which is at least partially transparent and passes light emitted by or reflected off the physical environment. In some implementations, the one or more I/O devices 410 include a speaker for outputting sounds (e.g., the sound 138 shown in FIG. 1K, the sound 142 or the musical sound 146 shown in FIG. 1L).

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including one or more processors, a display, one or more microphones, and a non-transitory memory:
   displaying, via the display, a computer graphics environment that includes a virtual object with a first visual appearance, wherein the virtual object represents a physical element;
   detecting, via the one or more microphones, an audible utterance from a user within a physical environment, wherein the audible utterance is associated with one or more audio characteristics;
   determining whether the physical element that the virtual object represents is capable of generating the audible utterance from the user within the physical environment; and
   in response to determining that the physical element that the virtual object represents is capable of generating the audible utterance from the user within the physical environment:
   generating a second virtual object based on the one or more audio characteristics of the audible utterance from the user within the physical environment; and
   concurrently displaying, via the display, the second virtual object in association with the virtual object with the first visual appearance within the computer graphics environment, wherein the second virtual object provides an appearance that the virtual object is generating the audible utterance within the computer graphics environment.

2. The method of claim 1, further comprising:
   changing the appearance of the virtual object from the first visual appearance to a second visual appearance different from the first visual appearance that comprises displaying a movement of the virtual object from a first position in the computer graphics environment to a second position in the computer graphics environment that is different from the first position.

3. The method of claim 2, wherein a distance between the first position and the second position is a function of the one or more audio characteristics of the audible utterance from the user within the physical environment.

4. The method of claim 2, wherein displaying the movement comprises displaying a first amount of movement when an amplitude of the audible utterance from the user within the physical environment is below a threshold amplitude and displaying a second amount of movement that is greater than the first amount of movement when the amplitude is greater than the threshold amplitude.

5. The method of claim 1, further comprising:
   changing the appearance of the virtual object from the first visual appearance to a second visual appearance different from the first visual appearance that comprises displaying a change in a state of the virtual object from a first state to a second state that is different from the first state.

6. The method of claim 5, wherein a speed at which the change in the state is displayed is a function of the one or more audio characteristics of the audible utterance from the user within the physical environment.

7. The method of claim 5, wherein displaying the change in the state of the virtual object comprises displaying the change at a first speed when the audible utterance from the user within the physical environment is associated with a first tone and displaying the change at a second speed that is different from the first speed when the audible utterance from the user within the physical environment is associated with a second tone that is different from the first tone.

8. The method of claim 1, wherein displaying the second virtual object comprises selecting the second virtual object from a set of virtual objects based on the one or more audio characteristics of the audible utterance from the user within the physical environment.

9. The method of claim 1, wherein the one or more audio characteristics of the audible utterance include an amplitude of the audible utterance.

10. The method of claim 1, wherein the one or more audio characteristics of the audible utterance include a frequency of the audible utterance.

11. The method of claim 1, wherein displaying the computer graphics environment comprises displaying the virtual object in response to a user request to display the virtual object.

12. The method of claim 1, further comprising:
    changing the appearance of the virtual object from the first visual appearance to a second visual appearance different from the first visual appearance that comprises animating one or more components of the virtual object in order to provide the appearance that the virtual object is generating the audible utterance.

13. The method of claim 1, further comprising:
    changing the appearance of the virtual object from the first visual appearance to a second visual appearance different from the first visual appearance that comprises animating the virtual object in order to provide an appearance that the virtual object is generating another sound that corresponds to the audible utterance.

14. The method of claim 1, further comprising:
in response to determining that the physical element that the virtual object represents is not capable of generating the audible utterance, maintaining the first visual appearance of the virtual object and forgoing display of the second virtual object within the computer graphics environment.

15. The method of claim 1, wherein determining whether the physical element that the virtual object represents is capable of generating the audible utterance includes:
identifying a set of physical elements associated with the audible utterance from the user within the physical environment; and
determining whether the physical element is within a similarity threshold relative to the set of physical elements associated with the audible utterance from the user within the physical environment.

16. A device comprising:
a display;
one or more microphones;
one or more processors;
a non-transitory memory; and
one or more programs stored in the non-transitory memory, which, when executed by the one or more processors, cause the device to:
display, via the display, a computer graphics environment that includes a first virtual object with a first visual appearance and a second virtual object with a second visual appearance, wherein the first virtual object represents a first physical element and the second virtual object represents a second physical element;
detect, via the one or more microphones, an audible utterance from a user within a physical environment, wherein the audible utterance is associated with one or more audio characteristics;
determine whether the first physical element that the first virtual object represents or the second physical element that the second virtual object represents is capable of generating the audible utterance from the user within the physical environment;
in response to determining that the first physical element that the first virtual object represents is capable of generating the audible utterance detected from the user within the physical environment, change an appearance of the first virtual object within the computer graphics environment from the first visual appearance to a third visual appearance that is different from the first visual appearance by modifying visual property of the first virtual object based on the one or more audio characteristics of the audible utterance from the user within the physical environment to visually indicate that the first virtual object is generating the audible utterance within the computer graphics environment; and
in response to determining that the second physical element that the second virtual object represents is capable of generating the audible utterance detected from the user within the physical environment, change an appearance of the second virtual object within the computer graphics environment from the second visual appearance to a fourth visual appearance by modifying a visual property of the second virtual object based on the one or more audio characteristics of the audible utterance from the user within the physical environment to visually indicate that the second virtual object is generating the audible utterance within the computer graphics environment.

17. The device of claim 16, wherein changing the appearance of the virtual object from the first visual appearance to the second visual appearance comprises displaying a movement of the virtual object from a first position in the computer graphics environment to a second position in the computer graphics environment that is different from the first position.

18. The device of claim 16, wherein changing the appearance of the virtual object from the first visual appearance to the second visual appearance comprises animating one or more components of the virtual object in order to provide the appearance that the virtual object is generating the audible utterance.

19. A non-transitory memory storing one or more programs, which, when executed by one or more processors of a device with a display and one or more microphones, cause the device to:
display, via the display, a computer graphics environment that includes a first virtual object with a first visual appearance and a second virtual object with a second visual appearance, wherein the first virtual object represents a first physical element and the second visual object represents a second physical element;
detect, via the one or more microphones, an audible utterance from a user within a physical environment, wherein the audible utterance is associated with one or more audio characteristics;
determine whether the first physical element that the first virtual object represents or the second physical element that the second virtual object represents in capable of generating the audible utterance from the user within the physical environment;
in response to determining that the first physical element that the first virtual object represents is capable of generating the audible utterance detected from the user within the physical environment, change an appearance of the first virtual object within the computer graphics environment from the first visual appearance to a third visual appearance that is different from the first visual appearance by modifying a visual property of the first virtual object based on the one or more audio characteristics of the audible utterance from the user within the physical environment to visually indicate that the first virtual object is generating the audible utterance within the computer graphics environment; and
in response to determining that the second physical element that the second virtual object represents is capable of generating the audible utterance detected from the user within the physical environment, change an appearance of the second virtual object within the computer graphics environment from the second visual appearance to a fourth visual appearance by modifying a visual property of the second virtual object based on the one or more audio characteristics of the audible utterance from the user within the physical environment to visually indicate that the second virtual object is generating the audible utterance within the computer graphics environment.

20. The non-transitory memory of claim 19, wherein changing the appearance of the virtual object from the first visual appearance to the second visual appearance comprises displaying a movement of the virtual object from a first position in the computer graphics environment to a second position in the computer graphics environment that is different from the first position.

21. The non-transitory memory of claim 20, wherein a distance between the first position and the second position is a function of the one or more audio characteristics of the audible utterance from the user within the physical environment.

22. The non-transitory memory of claim 19, wherein changing the appearance of the virtual object from the first visual appearance to the second visual appearance comprises animating one or more components of the virtual object in order to provide the appearance that the virtual object is generating the audible utterance.

* * * * *